US012786903B2

(12) United States Patent
Horn et al.

(10) Patent No.: US 12,786,903 B2
(45) Date of Patent: Nov. 3, 2026

(54) SYNCHRONIZATION SIGNAL BLOCK CONFIGURATIONS

(71) Applicant: QUALCOMM Incorporated, San Diego, CA (US)

(72) Inventors: Idan Michael Horn, Hod Hasharon (IL); Shay Landis, Hod Hasharon (IL); Daniel Paz, Geva Carmel (IL)

(73) Assignee: QUALCOMM Incorporated, San Diego, CA (US)

( * ) Notice: Subject to any disclaimer, the term of this patent is extended or adjusted under 35 U.S.C. 154(b) by 799 days.

(21) Appl. No.: 17/885,923

(22) Filed: Aug. 11, 2022

(65) Prior Publication Data

US 2024/0056994 A1 Feb. 15, 2024

(51) Int. Cl.

| | |
|---|---|
| ***H04W 72/00*** | (2023.01) |
| ***H04W 24/08*** | (2009.01) |
| ***H04W 56/00*** | (2009.01) |
| ***H04W 72/0446*** | (2023.01) |
| ***H04W 72/0453*** | (2023.01) |

(52) U.S. Cl.

CPC ......... *H04W 56/001* (2013.01); *H04W 24/08* (2013.01); *H04W 72/0446* (2013.01); *H04W 72/0453* (2013.01)

(58) Field of Classification Search

CPC ........... H04W 56/001; H04W 56/0015; H04W 24/08; H04W 72/0446; H04W 72/0453

See application file for complete search history.

(56) References Cited

U.S. PATENT DOCUMENTS

2010/0296547 A1* 11/2010 Skillermark ........... H04B 1/715 375/132
2014/0198772 A1* 7/2014 Baldemair et al. ... H04W 56/00 370/335
2017/0353255 A1* 12/2017 Islam et al. ............. H04J 1/065 455/458
2018/0183488 A1* 6/2018 Qu ........................ H04W 56/00
2018/0206241 A1* 7/2018 Matsumoto et al. ........................ H04W 72/082
2019/0028315 A1 1/2019 Park
(Continued)

FOREIGN PATENT DOCUMENTS

WO WO2021247222 A1 * 12/2021 ........ H40W 56/0015

*Primary Examiner* — Marcus Smith
*Assistant Examiner* — Shivakrishna Vallamdasu
(74) *Attorney, Agent, or Firm* — QUALCOMM Incorporated

(57) ABSTRACT

Methods, systems, and devices for wireless communications are described. A user equipment (UE) may monitor for a set of synchronization signals that includes a first subset of synchronization signals allocated according to a first time-frequency pattern and a second subset of synchronization signals allocated according to a second time-frequency pattern different than the first time-frequency pattern. The first subset of synchronization signals and the second subset of synchronization signals are monitored during a first time interval. The UE may receive one or more synchronization signals of the set of synchronization signals based on the monitoring. The UE may establish a connection with a network entity based on receiving the one or more synchronization signals. The UE may receive an indication of the second time-frequency pattern from one or more synchronization signals of the first subset of synchronization signals.

26 Claims, 16 Drawing Sheets

(56) References Cited

U.S. PATENT DOCUMENTS

| | | | | |
|---|---|---|---|---|
| 2020/0153500 | A1* | 5/2020 | Kim | H04W 72/27 |
| 2020/0404600 | A1* | 12/2020 | Ly et al. | H04W 8/24 |
| 2021/0289454 | A1* | 9/2021 | Sun et al. | H04W 76/20 |
| 2022/0417874 | A1* | 12/2022 | Kwak | H04W 56/001 |

* cited by examiner

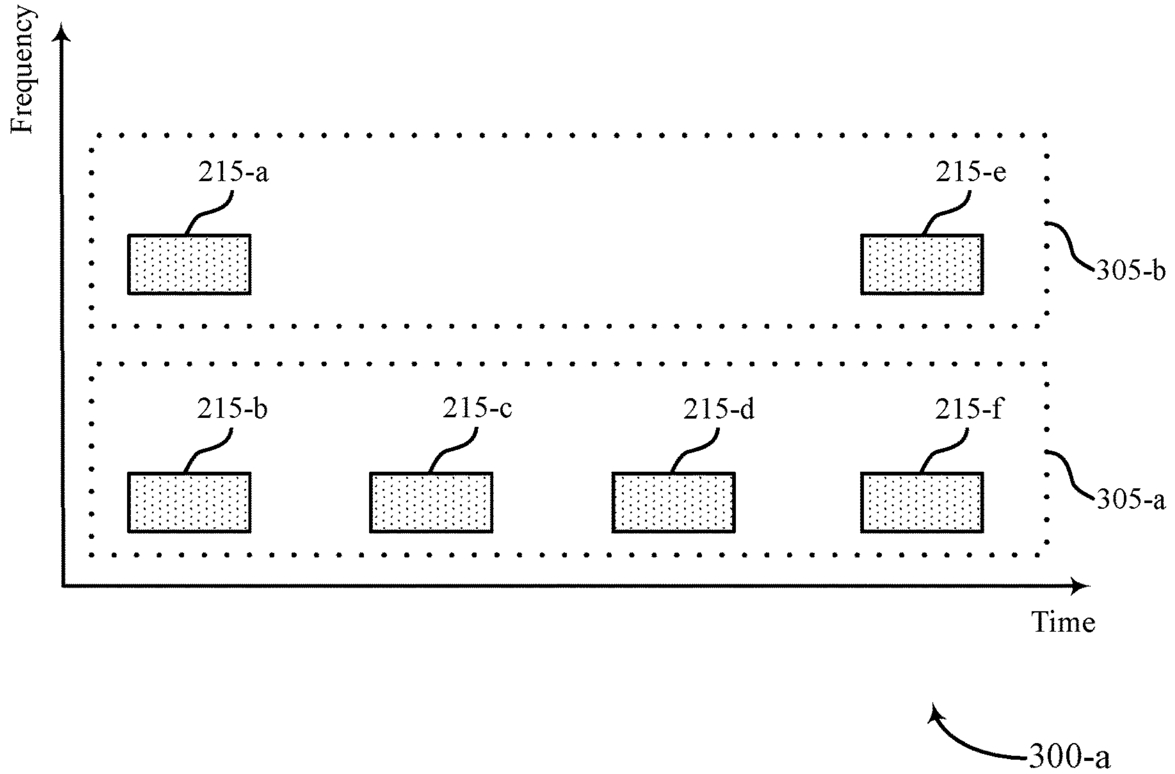
FIG. 3A
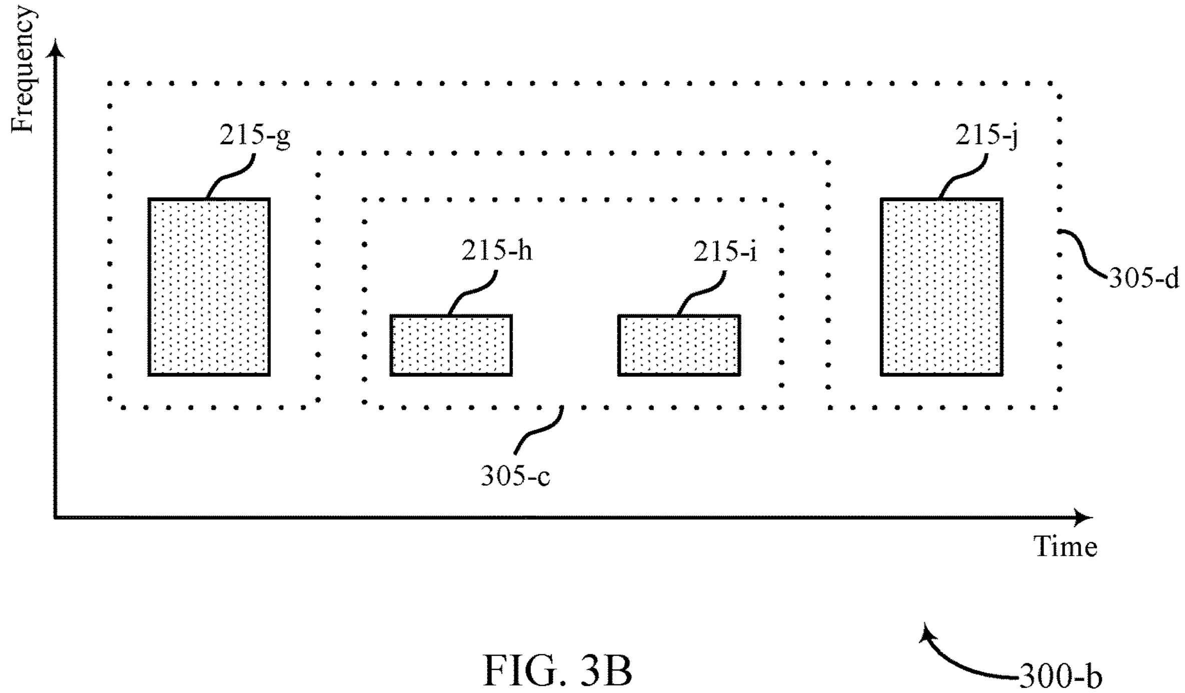
FIG. 3B

SYNCHRONIZATION SIGNAL BLOCK CONFIGURATIONS

FIELD OF TECHNOLOGY

The following relates to wireless communications, including synchronization signal block configurations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities (e.g., base stations), each supporting wireless communication for communication devices, which may be known as user equipment (UE).

Some wireless communications systems may support synchronization signal (e.g., synchronization signal block (SSB)) communications between network devices. For example, a network entity may transmit one or more synchronization signals to establish or maintain wireless connections with one or more UEs. In some cases, a UE may receive a synchronization signal and perform one or more operations to synchronize communications with a network entity. In some cases, a network entity may transmit one or more synchronization signals using time-frequency resources, which may be fixed (e.g., predetermined, preconfigured). Accordingly, UEs may be configured to monitor for the one or more synchronization signals using the time-frequency resources.

SUMMARY

The described techniques relate to improved methods, systems, devices, and apparatuses that support synchronization signal block configurations. For example, the described techniques provide for a network entity to transmit a set of synchronization signals according to one or more time-frequency patterns. The set of synchronization signals may include a first subset of synchronization signals and a second subset of synchronization signals. The network entity may transmit the first subset of synchronization signals according to a first time-frequency pattern and the second subset of synchronization signals according to a second time-frequency pattern. Accordingly, a user equipment (UE) may monitor for the set of synchronization signals according to the first time-frequency pattern, the second time-frequency pattern, or both. The second time-frequency pattern may be different than the first time-frequency pattern. In some cases, the UE may monitor for the set of synchronization signals during a first time interval. The UE may receive one or more synchronization signals of the set of synchronization signals based on the monitoring. In some cases, the UE may establish a connection with a network entity based on receiving one or more synchronization signals of the set of synchronization signals.

A method for wireless communications at a user equipment (UE) is described. The method may include monitoring for a set of synchronization signals that includes a first subset of synchronization signals that are allocated according to a first time-frequency pattern and a second subset of synchronization signals that are allocated according to a second time-frequency pattern that is different than the first time-frequency pattern, where the first subset of synchronization signals and the second subset of synchronization signals are monitored during a first time interval, receiving one or more synchronization signals of the set of synchronization signals based on the monitoring, and establishing a connection with a network entity based on receiving the one or more synchronization signals.

An apparatus for wireless communications at a UE is described. The apparatus may include a processor, memory coupled with the processor, and instructions stored in the memory. The instructions may be executable by the processor to cause the apparatus to monitor for a set of synchronization signals that includes a first subset of synchronization signals that are allocated according to a first time-frequency pattern and a second subset of synchronization signals that are allocated according to a second time-frequency pattern that is different than the first time-frequency pattern, where the first subset of synchronization signals and the second subset of synchronization signals are monitored during a first time interval, receive one or more synchronization signals of the set of synchronization signals based on the monitoring, and establish a connection with a network entity based on receiving the one or more synchronization signals.

Another apparatus for wireless communications at a UE is described. The apparatus may include means for monitoring for a set of synchronization signals that includes a first subset of synchronization signals that are allocated according to a first time-frequency pattern and a second subset of synchronization signals that are allocated according to a second time-frequency pattern that is different than the first time-frequency pattern, where the first subset of synchronization signals and the second subset of synchronization signals are monitored during a first time interval, means for receiving one or more synchronization signals of the set of synchronization signals based on the monitoring, and means for establishing a connection with a network entity based on receiving the one or more synchronization signals.

A non-transitory computer-readable medium storing code for wireless communications at a UE is described. The code may include instructions executable by a processor to monitor for a set of synchronization signals that includes a first subset of synchronization signals that are allocated according to a first time-frequency pattern and a second subset of synchronization signals that are allocated according to a second time-frequency pattern that is different than the first time-frequency pattern, where the first subset of synchronization signals and the second subset of synchronization signals are monitored during a first time interval, receive one or more synchronization signals of the set of synchronization signals based on the monitoring, and establish a connection with a network entity based on receiving the one or more synchronization signals.

Some examples of the method, apparatuses, and non-transitory computer-readable medium described herein may further include operations, features, means, or instructions for receiving an indication of the second time-frequency pattern from one or more synchronization signals of the first subset of synchronization signals.

In some examples of the method, apparatuses, and non-transitory computer-readable medium described herein, the first time-frequency pattern corresponds to a first frequency allocation of the first subset of synchronization signals on a first set of frequency resources and a first repeating time allocation according to a first periodicity, the second time-frequency pattern corresponds to a second frequency allocation of the second subset of synchronization signals on a second set of frequency resources and a second repeating time allocation according to a second periodicity, and the first set of frequency resources may be different than the second set of frequency resources.

In some examples of the method, apparatuses, and non-transitory computer-readable medium described herein, one or more synchronization signals allocated to the first set of frequency resources at least partially overlap in time with one or more synchronization signals allocated to the second set of frequency resources.

In some examples of the method, apparatuses, and non-transitory computer-readable medium described herein, the first periodicity may be different than the second periodicity.

In some examples of the method, apparatuses, and non-transitory computer-readable medium described herein, the first set of frequency resources and the second set of frequency resources may be separated by a frequency bandwidth that may be greater than a channel coherence associated with the first subset of synchronization signals.

In some examples of the method, apparatuses, and non-transitory computer-readable medium described herein, the first time-frequency pattern corresponds to a first frequency allocation of the first subset of synchronization signals having a first bandwidth and a first repeating time allocation according to a first periodicity, the second time-frequency pattern corresponds to a second frequency allocation of the second subset of synchronization signals having a second bandwidth, and the first bandwidth may be different than the second bandwidth.

In some examples of the method, apparatuses, and non-transitory computer-readable medium described herein, the first bandwidth may be greater than the second bandwidth and the first bandwidth may be greater than a channel coherence associated with the first subset of synchronization signals.

In some examples of the method, apparatuses, and non-transitory computer-readable medium described herein, monitoring for the set of synchronization signals may include operations, features, means, or instructions for monitoring a first set of time-frequency resources for the one or more synchronization signals of the set of synchronization signals and monitoring a second set of time-frequency resources for the one or more synchronization signals of the set of synchronization signals.

Some examples of the method, apparatuses, and non-transitory computer-readable medium described herein may further include operations, features, means, or instructions for determining the first time-frequency pattern, the second time-frequency pattern, or both, based on receiving the one or more synchronization signals.

In some examples of the method, apparatuses, and non-transitory computer-readable medium described herein, receiving the one or more synchronization signals from the set of synchronization signals may include operations, features, means, or instructions for receiving a first synchronization signal of the first subset of synchronization signals, receiving a first synchronization signal of the second subset of synchronization signals, comparing one or more parameters for the first synchronization signal of the first subset with one or more parameters for the first synchronization signal of the second subset, and transmitting a message to the network entity that indicates whether to transmit subsequent messages using the first time-frequency pattern, the second time-frequency pattern, or both, based on the comparing.

Some examples of the method, apparatuses, and non-transitory computer-readable medium described herein may further include operations, features, means, or instructions for transmitting, to the network entity, one or more reference signals indicating one or more channel quality parameters, where the first time-frequency pattern may be based on the one or more channel quality parameters.

In some examples of the method, apparatuses, and non-transitory computer-readable medium described herein, the first time-frequency pattern indicates one or more carrier-frequencies for the first subset of synchronization signals, one or more bandwidths for the first subset of synchronization signals, a periodicity for the first subset of synchronization signals, or any combination thereof and the second time-frequency pattern indicates one or more carrier-frequencies for the second subset of synchronization signals, one or more bandwidths for the second subset of synchronization signals, a periodicity for the second subset of synchronization signals, or any combination thereof.

In some examples of the method, apparatuses, and non-transitory computer-readable medium described herein, each synchronization signal of the set of synchronization signals includes a synchronization signal block (SSB).

A method for wireless communications at a network entity is described. The method may include transmitting a first subset of synchronization signals based on a first time-frequency pattern, transmitting a second subset of synchronization signals based on a second time-frequency pattern different than the first time-frequency pattern, where the first subset of synchronization signals and the second subset of synchronization signals are transmitted during a first time interval, and establishing a connection with a UE based on transmitting the first subset of synchronization signals, the second subset of synchronization signals, or both.

An apparatus for wireless communications at a network entity is described. The apparatus may include a processor, memory coupled with the processor, and instructions stored in the memory. The instructions may be executable by the processor to cause the apparatus to transmit a first subset of synchronization signals based on a first time-frequency pattern, transmit a second subset of synchronization signals based on a second time-frequency pattern different than the first time-frequency pattern, where the first subset of synchronization signals and the second subset of synchronization signals are transmitted during a first time interval, and establish a connection with a UE based on transmitting the first subset of synchronization signals, the second subset of synchronization signals, or both.

Another apparatus for wireless communications at a network entity is described. The apparatus may include means for transmitting a first subset of synchronization signals based on a first time-frequency pattern, means for transmitting a second subset of synchronization signals based on a second time-frequency pattern different than the first time-frequency pattern, where the first subset of synchronization signals and the second subset of synchronization signals are transmitted during a first time interval, and means for establishing a connection with a UE based on transmitting the first subset of synchronization signals, the second subset of synchronization signals, or both.

A non-transitory computer-readable medium storing code for wireless communications at a network entity is described. The code may include instructions executable by a processor to transmit a first subset of synchronization signals based on a first time-frequency pattern, transmit a second subset of synchronization signals based on a second time-frequency pattern different than the first time-frequency pattern, where the first subset of synchronization signals and the second subset of synchronization signals are transmitted during a first time interval, and establish a connection with a UE based on transmitting the first subset of synchronization signals, the second subset of synchronization signals, or both.

In some examples of the method, apparatuses, and non-transitory computer-readable medium described herein, transmitting the first subset of synchronization signals may include operations, features, means, or instructions for transmitting an indication of the second time-frequency pattern, where one or more synchronization signals of the first subset of synchronization signals includes the indication.

In some examples of the method, apparatuses, and non-transitory computer-readable medium described herein, the first time-frequency pattern corresponds to a first frequency allocation of the first subset of synchronization signals on a first set of frequency resources and a first repeating time allocation according to a first periodicity, the second time-frequency pattern corresponds to a second frequency allocation of the second subset of synchronization signals on a second set of frequency resources and a second repeating time allocation according to a second periodicity, and the first set of frequency resources may be different than the second set of frequency resources.

In some examples of the method, apparatuses, and non-transitory computer-readable medium described herein, one or more synchronization signals allocated to the first set of frequency resources overlap in time with one or more synchronization signals allocated to the second set of frequency resources.

In some examples of the method, apparatuses, and non-transitory computer-readable medium described herein, the first periodicity may be different than the second periodicity.

In some examples of the method, apparatuses, and non-transitory computer-readable medium described herein, the first set of frequency resources and the second set of frequency resources may be separated by a frequency bandwidth that may be greater than a channel coherence associated with the first subset of synchronization signals.

In some examples of the method, apparatuses, and non-transitory computer-readable medium described herein, the first time-frequency pattern corresponds to a first frequency allocation of the first subset of synchronization signals having a first bandwidth and a first repeating time allocation according to a first periodicity, the second time-frequency pattern corresponds to a second frequency allocation of the second subset of synchronization signals having a second bandwidth, and the first bandwidth may be different than the second bandwidth.

In some examples of the method, apparatuses, and non-transitory computer-readable medium described herein, the first bandwidth may be greater than the second bandwidth and the first bandwidth may be greater than a channel coherence associated with the first subset of synchronization signals.

Some examples of the method, apparatuses, and non-transitory computer-readable medium described herein may further include operations, features, means, or instructions for determining the first time-frequency pattern, the second time-frequency pattern, or both, based on a configuration.

Some examples of the method, apparatuses, and non-transitory computer-readable medium described herein may further include operations, features, means, or instructions for receiving a message from the UE that indicates whether to transmit subsequent messages using the first time-frequency pattern, the second time-frequency pattern, or both.

Some examples of the method, apparatuses, and non-transitory computer-readable medium described herein may further include operations, features, means, or instructions for receiving, from the UE, one or more reference signals indicating one or more channel quality parameters and determining the first time-frequency pattern based on the one or more channel quality parameters.

In some examples of the method, apparatuses, and non-transitory computer-readable medium described herein, the first time-frequency pattern indicates one or more carrier-frequencies for the first subset of synchronization signals, one or more bandwidths for the first subset of synchronization signals, a periodicity for the first subset of synchronization signals, or any combination thereof and the second time-frequency pattern indicates one or more carrier-frequencies for the second subset of synchronization signals, one or more bandwidths for the second subset of synchronization signals, a periodicity for the second subset of synchronization signals, or any combination thereof.

In some examples of the method, apparatuses, and non-transitory computer-readable medium described herein, each synchronization signal of the first subset of synchronization signals and each synchronization signal of the second subset of synchronization signals includes a synchronization signal block (SSB).

BRIEF DESCRIPTION OF THE DRAWINGS

FIGS. 3A and 3B illustrate examples of resource configurations that support synchronization signal block configurations in accordance with one or more aspects of the present disclosure.

DETAILED DESCRIPTION

Figure 1:
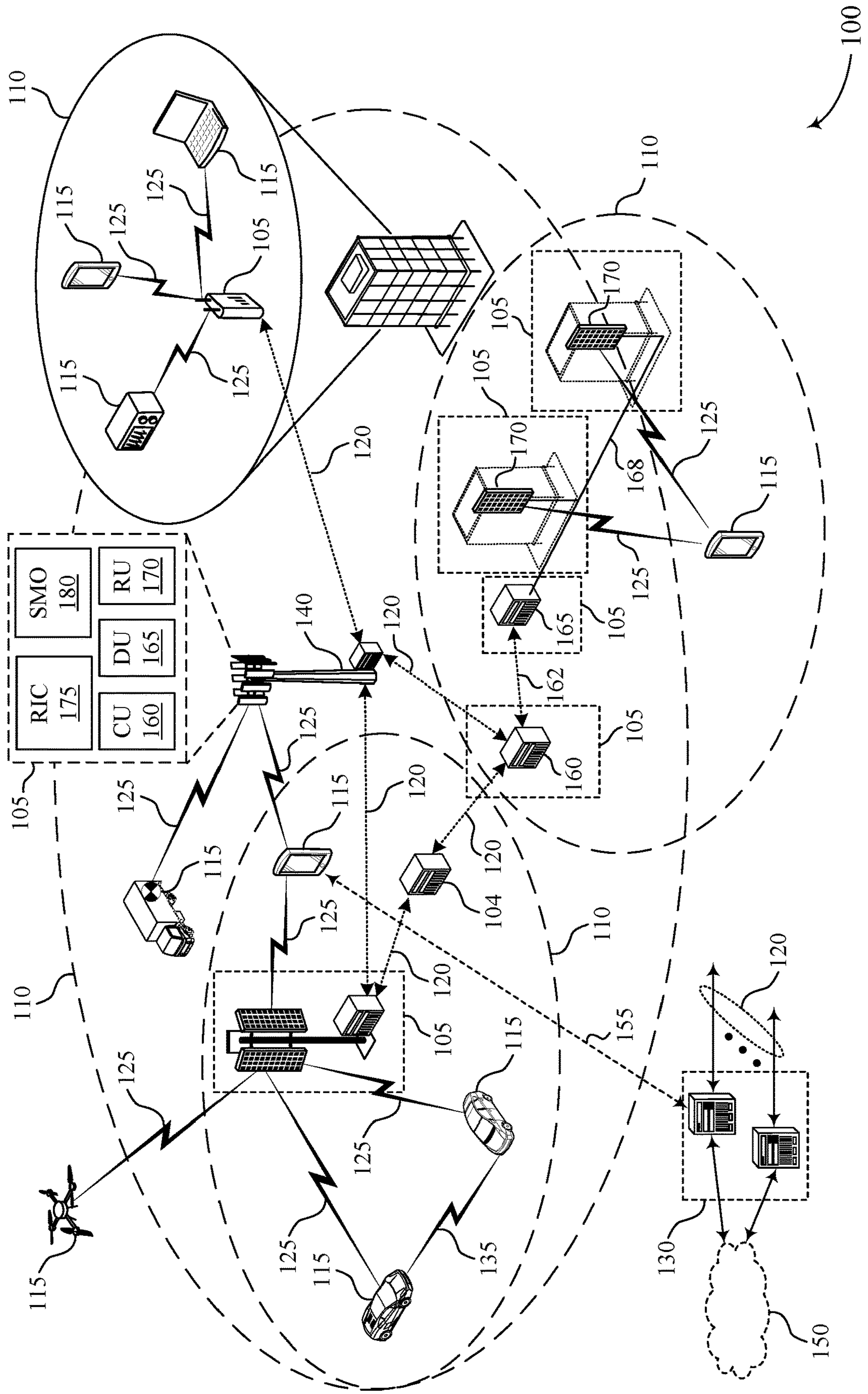
FIG. 1 illustrates an example of a wireless communications system that supports synchronization signal block configurations in accordance with one or more aspects of the present disclosure.

In some wireless communications systems, network devices may communicate synchronization signals to establish connections or synchronize communications with other network devices. For example, a network entity may periodically transmit one or more synchronization signal blocks (SSBs), which may enable a user equipment (UE) to establish and maintain a connection with the network entity. In some cases, a network entity may utilize pre-configured (e.g., constant, fixed) frequency resources for transmitting synchronization signals. For example, a network entity may periodically transmit synchronization signals using a specific carrier frequency. Each synchronization signal may have a bandwidth (e.g., may occupy a range of frequency resources), which may be centered around the carrier frequency. In some cases, despite being transmitted using a same carrier frequency, synchronization signals may have different frequency responses at different UEs (e.g., as a result of radio frequency (RF) chain variation or other variations in receiver characteristics among UEs). For example, different UEs may be equipped with different receivers or signal processing hardware, which may have device-specific effects on an average power of a same synchronization signal. Accordingly, transmitting synchronization signals using fixed frequency resources may result in inconsistent reception quality among UEs, which may limit a UE's ability to connect with or synchronize communications with a network entity.

In accordance with aspects of the present disclosure, a network entity may transmit synchronization signals using one or more time-frequency patterns, which may be configured dynamically and may include synchronization signals transmitted using different (e.g., varying) frequency resources. A time-frequency pattern may include an allocation for any combination of one or more carrier frequencies, one or more bandwidths, and a periodicity for synchronization signal transmissions. Transmitting synchronization signals according to the one or more time-frequency patterns may enable one or more UEs to more effectively receive (e.g., decode, process) synchronization signals. For example, using multiple time-frequency patterns for synchronization signals may increase reception quality for one or more UEs by creating frequency diversified synchronization signal transmissions resulting in increased detection probability.

In some cases, a time-frequency pattern may include multiple synchronization signals transmitted at a same time (e.g., using overlapping time resources) and using different frequency resources. In some other cases, a time-frequency pattern may include one or more synchronization signals with increased bandwidths (e.g., relative to other synchronization signals being transmitted in a synchronization signal set). Additionally, or alternatively, a network entity may transmit an indication of a time-frequency pattern (e.g., in an SSB, in a system information block (SIB)). In some cases, a UE may search (e.g., monitor) possible synchronization signal carrier frequencies (e.g., search multiple SSB channel rasters) and may detect one or more synchronization signals transmitted using one or more time-frequency patterns. A UE may determine a time-frequency pattern that results in an improved synchronization signal reception capability, and may transmit an indication of the time-frequency pattern to a network entity, which may result in increased communication efficiency.

Aspects of the disclosure are initially described in the context of wireless communications systems. Some aspects of the disclosure are further described with reference to resource configurations and process flows. Aspects of the disclosure are further illustrated by and described with reference to apparatus diagrams, system diagrams, and flowcharts that relate to synchronization signal block configurations.

FIG. 1 illustrates an example of a wireless communications system 100 that supports synchronization signal block configurations in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., an RF access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support synchronization signal block configurations as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some cases, a network entity 105 may transmit one or more SSBs for establishing and maintaining connections. In some cases, a network entity 105 may transmit one or more SSBs for beam selection purposes. A network entity 105 may associate and transmit each SSB of an SSB burst with a different transmit beam to sweep an entire cell range. Additionally, or alternatively, the network entity 105 may transmit each SSB using specific time-frequency resources. The network entity 105 may transmit an SSB using an OFDM waveform and multiple numerologies depending on the cell frequency. Based on the numerology used by the network entity 105, a different number of SSBs (e.g., or transmit beams) may be included in a single SSB burst.

A UE 115 within a coverage area of a network entity 105 may receive the one or more SSBs. The UE 115 may utilize the one or more SSBs to discover a cell, camp on the cell, connect to the cell, or any combination thereof. The UE 115 may utilize the one or more SSBs as part of an initial access procedure (e.g., an InitAck procedure). In some cases, the UE 115 may use the one or more SSBs to maintain a continuous time and frequency synchronization with a network entity 105, which may be for beam and automatic gain control (AGC) tracking (e.g., in a connected mode). Additionally or alternatively, the UE 115 may utilize the one or more SSBs to maintain serving cell measurements and neighboring cell measurements to support mobility and handover procedures between cells.

In some examples, a UE 115 may initially detect one or more SSBs through primary synchronization signal (PSS) sequence detection, in which the UE 115 may use a time domain correlation of the received signal with multiple PSS signal hypotheses covering a multi-dimensional search space including time, sequence (e.g., corresponding to a cell identifier for the UE 115), frequency offset, beam, SSB frequency raster, numerology hypotheses, or any combination thereof. That is, the UE 115 may detect a PSS sequence which may span multiple domains (e.g., time domain, frequency domain, sequence domain) and correlate the PSS sequence to the multiple domains to connect with a corresponding network entity 105. If the UE 115 is unable detect the one or more SSBs, the UE 115 may be unable to establish a connection with the network entity 105, which may result in decreased system performance.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC)

or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

A network entity 105 may transmit one or more synchronization signals to a UE 115 to establish a connection or synchronize communications. For example, a network entity 105 may periodically transmit one or more SSBs, which may enable a UE 115 to establish and maintain a connection with the network entity 105. In some cases, a network entity 105 may utilize pre-configured (e.g., constant, fixed) frequency resources for transmitting synchronization signals. For example, a network entity 105 may periodically transmit synchronization signals using a specific carrier frequency. Each synchronization signal may have a bandwidth (e.g., may occupy a range of frequency resources), which may be centered around the carrier frequency.

In some cases, despite being transmitted using a same carrier frequency, synchronization signals (e.g., of a set of synchronization signals) may have different frequency responses at different UEs 115 (e.g., as a result of RF chain variation or other variations in receiver characteristics among UEs 115). For example, different UEs 115 may be equipped with different receivers or signal processing hardware, which may have device-specific effects on an average power of a same synchronization signal. Accordingly, transmitting synchronization signals using fixed frequency resources may result in inconsistent reception quality among UEs 115, which may limit an ability of a UE 115 to connect with or synchronize communications with a network entity 105.

In accordance with aspects of the present disclosure, a network entity 105 may transmit synchronization signals using one or more time-frequency patterns, which may be configured dynamically and may include synchronization signals transmitted using different (e.g., varying) frequency resources. A time-frequency pattern may include an allocation for any combination of one or more carrier frequencies, one or more bandwidths, and a periodicity for synchronization signal transmissions. Transmitting synchronization signals according to the one or more time-frequency patterns may enable one or more UEs 115 to more effectively receive (e.g., decode, process) synchronization signals. For example, using multiple time-frequency patterns for synchronization signals may increase reception quality for one or more UEs 115 by creating frequency diversified synchronization signal transmissions resulting in increased detection probability.

Figure 2:
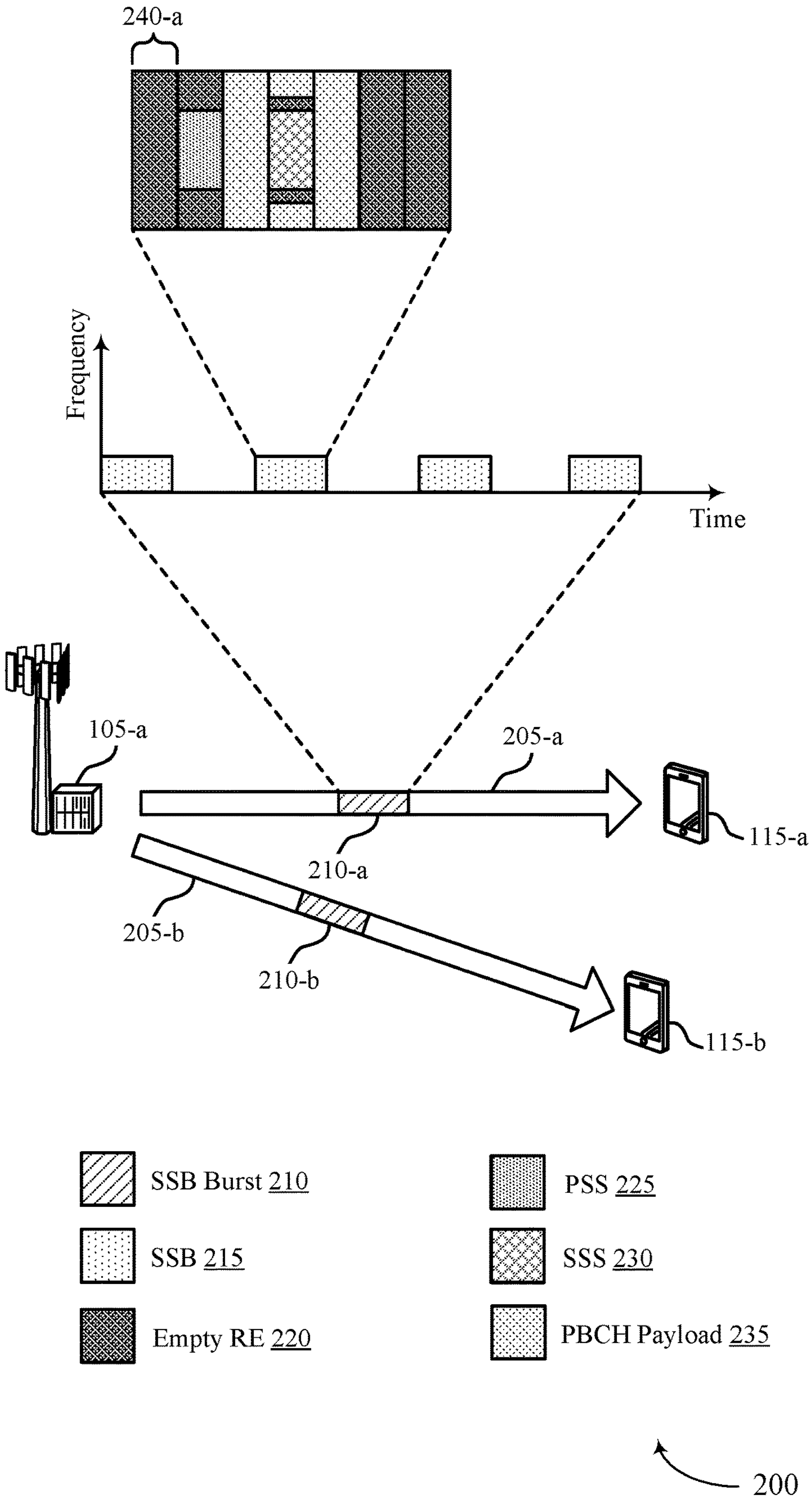
FIG. 2 illustrates an example of a wireless communications system that supports synchronization signal block configurations in accordance with one or more aspects of the present disclosure.

FIG. 2 illustrates an example of a wireless communications system 200 that supports synchronization signal block configurations in accordance with aspects of the present disclosure. In some cases, the wireless communications system 200 may implement aspects of the wireless communications system 100. For example, the wireless communications system 200 may include a network entity 105-*a*, a UE 115-*a*, and a UE 115-*b*, which may be examples of network entities 105 and UEs 115 as described with reference to FIG. 1. The wireless communications system 200 may also include communication links 205, which may be examples of communication links 125, as described with reference to FIG. 1.

The network entity 105-*a* may transmit one or more synchronization signals (e.g., a set of synchronization signals, a burst of synchronization signals) to a UE 115. For example, the network entity 105-*a* may transmit an SSB burst 210-*a* to the UE 115-*a* via the communication link 205-*a*. Additionally, or alternatively, the network entity 105-*a* may transmit an SSB burst 210-*b* to the UE 115-*b*. Each SSB burst 210 may include one or more SSBs 215. In some cases, a UE 115 may utilize one or more SSBs 215 for establishing a connection with a network entity 105-*a*. In some other cases, a UE 115 may utilize one or more SSBs 215 for maintaining a connection with a network entity 105-*a* (e.g., for synchronizing time-frequency resources). In some cases, a network entity 105-*a* may transmit one or more SSBs 215 over a communication link 205 (e.g., if a connection between the network entity 105-*a* and a UE 115 has been previously established).

In some other cases, however, a network entity 105-*a* may multicast (e.g., broadcast or groupcast) one or more SSBs 215 (e.g., synchronization signals) over a broadcast channel (BCH) (e.g., a broadcast control channel (BCCH), a physical broadcast channel (PBCH)). The network entity 105-*a* may multicast the one or more SSBs 215 without previously establishing a connection with a UE 115. In such cases, a UE 115 may receive one or more SSBs 215 and perform one or more operations for establishing a connection (e.g., establishing a communication link 205) with the network entity 105-*a* based on receiving the one or more SSBs 215. In some cases, the network entity 105-*a* may transmit one or more SSBs 215 periodically (e.g., with a periodicity of 5 milliseconds (ms), 10 ms, 20 ms, 40 ms, 80 ms, 160 ms, or any other periodicity).

A network entity 105-*a* may transmit an SSB 215 according to a frame structure, which may be an example of a configuration for time-frequency resources for an SSB 215. For example, a frame structure for an SSB 215 may include one or more empty resource elements (REs) 220, one or more primary synchronization signals (PSSs) 225, one or more secondary synchronization signals (SSSs) 230, and one or more PBCH payloads 235. In some cases, the frame structure may include any quantity or ordering of empty REs 220, PSSs 225, SSSs 230, and PBCH payloads 235. Although FIG. 2 shows an illustrative example of a frame structure for an SSB 215, as described herein, SSBs 215 may be communicated according to any other frame structure. The network entity may transmit each SSBs 215 using a quantity of symbols 240 (e.g., OFDM symbols).

A network entity 105-*a* may periodically transmit one or more SSBs 215 such that UEs 115 within a coverage area (e.g., a cell) may establish or maintain connections with the network entity 105-*a*. The coverage area for the network entity 105-*a* may include a UE 115-*a* and a UE 115-*b*. In some cases, the network entity 105-*a* may transmit the one or more SSBs 215 (e.g., an SSB burst 210-*a* and an SSB burst 210-*b*) via respective communication links 205. Additionally or alternatively, the network entity 105-*a* may multicast one or more SSBs 215 via a BCH and one or more of the UE 115-*a* and the UE 115-*b* may receive the one or more SSBs 215. In some cases, the UE 115-*a* and the UE 115-*b* may each receive different SSBs 215 (e.g., SSBs 215 transmitted at different times but using one or more same frequency resources). In some other cases, the UE 115-*a* and the UE 115-*b* may both receive a same SSB 215.

In some cases, the network entity 105-*a* may select (e.g., allocate) specific (e.g., fixed, constant) frequency resources (e.g., a carrier frequency, a bandwidth) to transmit the one or more SSBs 215. For example, each SSB burst 210 may include multiple SSBs 215 transmitted using a same set of frequency resources based on a constant frequency allocation for SSBs 215. However, each UE 115 may process (e.g., receive) the one or more SSBs differently due to the different frequency responses of their respective RF chains (e.g., RF processing components). As such, some UEs 115 may experience reduced performance when compared to other UEs 115. For example, the UE 115-*a* and the UE 115-*b* may be equipped with different receiving components, which may experience different effects from an SSB 215.

In some cases, the network entity 105-*a* may transmit an SSB 215 at a specific power, which may depend on one or more frequency resources used for the SSB 215. The UE 115-*a* and the UE 115-*b* may each receive the SSB 215 using respective receiving components (e.g., hardware components), which may alter the SSB 215. For example, a receiver of the UE 115-*a* may output a first signal based on the SSB 215 and a receiver of the UE 115-*b* may output a second signal based on the SSB 215. In some cases, the first signal may have a higher average power than the second signal. For example, the receiver of the UE 115-*a* may have a higher efficiency than the receiver of the UE 115-*b*. As a result, the UE 115-*b* may experience performance issues such as difficulty connecting to the network entity 105-*a* due to high misdetection probability for PSSs 225 and SSSs 230, lower reception power, and other reduced performance issues.

In some cases, the network entity 105-*a* and the UEs 115 may operate in relatively high frequency ranges when compared to other UEs (e.g., sub-THz frequencies, frequency range 3 (FR3), FR4, FR5). Operating in high frequency ranges may present challenges associated with receiving SSBs 215 using fixed frequency resources. For example, transmissions using relatively high operating frequencies may cause relatively large average power variations (e.g., 10 dB peak-to-peak) among UEs 115. For example, RF chains of UEs 115 may have non-constant frequency responses.

As described in accordance with aspects of the present disclosure, a network entity 105-*a* may transmit one or more SSBs 215 (e.g., synchronization signals) using one or more time-frequency patterns, which may be configured dynamically. The configured patterns may create frequency diversified synchronization signals (e.g., the SSB 215 diversity order will increase), such that there is an increased probability that each of the one or more UEs 115 within the coverage area may successfully communicate (e.g., establish connection, maintain tracking loops) with the network entity 105-*a*. For example, a network entity 105-*a* may select a time-frequency pattern for SSB 215 transmissions based on a capability of each UE 115 for receiving one or more SSBs 215 using the time-frequency pattern.

In some cases, the time-frequency pattern (e.g., for SSBs 215) may include multiple SSBs 215 using shared time resources but different frequency resources (e.g., duplicating SSBs 215), which is described in further detail with reference to FIG. 3A. Additionally or alternatively, the time-frequency pattern may include SSBs 215 with different bandwidths (e.g., using different ranges of frequency resources), which is described in further detail with reference to FIG. 3B. In some cases, the network entity 105-*a* may update the time-frequency pattern based on estimating the channel response according to UE 115 sounding reference signal (SRS) measurements. In such cases, the network entity 105-*a* may transmit a message to one or more UEs 115 indicating the new time-frequency pattern. In some cases, a network entity 105-*a* may configure SSB 215 locations (e.g., a time-frequency pattern) based on RF channel measurements performed as part of a calibration or testing procedure, which may occur prior to deployment of a network entity 105-*a*.

FIG. 3A illustrates an example of a resource configuration 300-*a* that supports synchronization signal block configurations in accordance with aspects of the present disclosure. In some cases, the resource configuration 300-*a* may be implemented by one or more aspects of the wireless communications system 100 or the wireless communications system 200. For example, a network entity 105, as described with reference to FIGS. 1 and 2 may transmit one or more SSBs 215 using the resource configuration 300-*a* to increase the frequency diversity of SSBs 215. The resource configuration 300-*a* may include one or more SSBs 215, which may be examples of the one or more SSBs 215 as described with reference to FIG. 2. The resource configuration 300-*a* may include one or more SSBs 215 allocated according to one or more time-frequency patterns.

Each SSB 215 of the resource configuration 300-*a* may be included in a subset 305-*a* or a subset 305-*b*. The subset 305-*a* may include an SSB 215-*b*, an SSB 215-*c*, an SSB 215-*d*, and an SSB 215-*f*. The subset 305-*b* may include the SSB 215-*a* and the SSB 215-*e*. Each SSB 215 in the subset 305-*a* may be allocated according to a first time-frequency pattern and each SSB 215 in the subset 305-*b* may be allocated according to a second time-frequency pattern. For example, a network entity 105 may transmit each SSB 215 of the subset 305-*a* using a same set of frequency resources. That is, a network entity 105 may transmit each SSB 215 of the subset 305-*a* using a same carrier frequency. Additionally, or alternatively, a network entity 105 may transmit each SSB 215 of the subset 305-*a* according to a first periodicity (e.g., a first repeating time allocation).

Each SSB 215 in the subset 305-*b* may be allocated according to the second time-frequency pattern. For example, a network entity 105 may transmit each SSB 215 of the subset 305-*b* using frequency resources different than the frequency resources for the subset 305-*a*. That is, a network entity 105 may transmit each SSB 215 of the subset 305-*b* using a same carrier frequency. The carrier frequency for the SSB 215-*a* may be different than the carrier frequency for the SSB 215-*b*. In some cases, a network entity 105 may select frequency resources such that a frequency spacing between SSBs 215 of the subset 305-*a* and SSBs 215 of the subset 305-*b* is larger than a channel coherence. Additionally, or alternatively, a network entity 105 may transmit each SSB 215 of the subset 305-*b* according to a second periodicity (e.g., a second repeating time allocation). In some cases, the second periodicity may be different than the first periodicity. In some other cases, the second periodicity may be a same periodicity as the first periodicity (not shown).

The subset 305-*b* may include one or more duplications of SSBs 215 included in the subset 305-*a*, or vice versa. For example, the SSB 215-*a* may be a duplication of the SSB 215-*b*. Additionally, or alternatively, the SSB 215-*e* may be a duplication of the SSB 215-*f*. In some cases, duplicated SSBs 215 may have a same frame structure or may include one or more same symbols 240 (e.g., one or more symbols 240 may be allocated for a same resource or information type). Additionally, or alternatively, duplicated SSBs 215 may include duplicated information. For example, the SSB 215-*a* may have a same PBCH payload 235 as the SSB 215-*b*.

In some cases, two or more SSBs 215 may overlap in time, but may be different. For example, the SSB 215-*a* and the SSB 215-*b* may have a different frame structure or may carry different information. Additionally, or alternatively, two or more SSBs 215 (e.g., that overlap in time) may use a different coding scheme or sequence while using a same PBCH payload 235. In some cases, a PBCH payload 235 may be split (e.g., divided) between two or more SSBs 215. For example, the SSB 215-*a* may include a first portion of a PBCH payload 235 and the SSB 215-*b* may include a second portion of the PBCH payload 235. Additionally or alternatively, SSBs 215 included in the subset 305-*a* may have smaller or larger bandwidths than SSBs 215 included in the subset 305-*b*.

In some cases, a network entity 105 may select time-frequency resources for SSBs 215 based on a frequency range (e.g., based on a frequency raster). For example, a network entity 105 may select one or more time-frequency resources for SSBs 215 that correspond to frequencies included in a frequency raster. Additionally, or alternatively, a network entity 105 may select one or more time-frequency resources for SSBs 215 that correspond to extents (e.g., edges) of a frequency raster. In some cases, a network entity 105 may select time-frequency resources for SSBs 215 that are symmetrical (e.g., mirrored) with respect to a center frequency (e.g., a band center). A network entity 105 may select time-frequency resources for SSBs 215 based on a frequency raster so that a UE 115 may receive (e.g., detect) the SSBs 215 (e.g., as part of a channel raster scanning operation).

As described herein, SSBs 215 of the subset 305-*a* may overlap in time with SSBs 215 of the subset 305-*b*. In some other cases, however, SSBs 215 of the subset 305-*a* may not overlap in time with SSBs 215 of the subset 305-*b*. For example, the SSB 215-*a* may not overlap in time with the SSB 215-*b*. In some cases, transmitting SSBs 215 at different or partially non-overlapping time instances may conserve (e.g., increase) a transmit power for each SSB 215. In some cases, a UE 115 may combine one or more SSBs 215 (e.g., SSBs 215 that overlap in time) during one or more operations for processing or receiving the SSBs 215. For example, a UE 115 may perform coherent combining between correlation results for the SSB 215-*a* and the SSB 215-*b*, which may increase processing quality (e.g., increase SINR processing gain).

In some cases, the network entity 105 may transmit an indication of a time-frequency pattern for SSBs 215. For example, the indication may be transmitted in one or more SIBs, or in one or more synchronization signals (e.g., added bits in the PBCH), or both. The indication may indicate whether one or more SSBs 215 is duplicated, one or more time-frequency resources for SSBs 215, one or more periodicities for SSBs 215, one or more bandwidths for SSBs 215, or any combination thereof. In some cases, a UE 115 may receive an SSB 215, which may include an indication, and the UE 115 may adapt tracking loops based on the indication to improve performance.

In some cases, a network entity 105 may configure time-frequency resources for SSBs 215 based on one or more RF channel measurements, which may be performed during an initial set up procedure for the network entity 105. In some other cases, the network entity 105 may configure time-frequency resources for SSBs 215 based on the estimating a channel response. For example, a UE 115 may transmit one or more sounding reference signals (SRSs), which may be received by the network entity 105 and utilized for time-frequency resource selection for SSBs 215. Additionally or alternatively, the network entity may dynamically update one or more time-frequency resources for SSBs 215. In such cases, the network entity 105 may transmit an indication (e.g., via SIB, via PBCH) of the updated resource configuration to a UE 115.

In some cases, a UE 115 may scan (e.g., search, monitor) frequency resources (e.g., multiple frequency rasters) to detect one or more SSBs 215. For example, the UE 115 may monitor frequency resources for SSBs 215 of the subset 305-*a* and frequency resources for SSBs 215 of the subset 305-*b*. In some cases, the UE 115 may receive or detect SSBs 215 on different frequency resources, and may perform one or more operations to determine one or more parameters for each SSB 215 (e.g., one or more parameters associated with reception quality, reception power, or both). For example, a UE 115 may determine an average power associated with each SSB 215 or a signal quality associated with each SSB 215. Additionally or alternatively, the UE 115 may process multiple SSB 215 mappings (e.g., test correlation results between multiple SSBs 215) to increase performance (e.g., determine an ideal beam, increase estimation reliability).

The UE 115 may transmit an indication of one or more SSBs 215 (e.g., one or more SSBs 215 associated with improved performance) to the network entity 105. For example, the UE 115 may transmit an indication of a preferred time-frequency pattern for SSB 215 transmissions. The network entity 105 may receive the indication and may determine to transmit the one or more SSBs 215 (e.g., the one or more indicated SSBs 215) based on receiving the signaling (e.g., for increased communication efficiency). For example, the network entity 105 may determine to transmit one or more SSBs 215 according to a time-frequency pattern indicated by the UE 115. In some cases, the network entity 105 may trigger PDSCH resources based on the indication of the one or more SSBs 215. Additionally or alternatively, the UE 115 may combine multiple SSBs 215 (e.g., SSB 215-*a* and SSB 215-*b*) via non-coherent combining to increase processing efficiency.

In some cases, a network entity 105 may not transmit an indication of one or more time-frequency patterns for SSB 215 transmissions. In such cases, the one or more time-frequency patterns for SSB 215 transmission may not be known to a UE 115 (e.g., a duplication pattern is not predefined). In such cases, the network entity 105 may transmit one or more SSBs 215 (e.g., according to the one or more time-frequency patterns). The UE 115 may search time-frequency resources for the one or more SSBs 215. The UE 115 may detect an SSB 215 and establish a connection with the network entity 105 based on the detection.

FIG. 3B illustrates an example of a resource configuration 300-*b* that supports synchronization signal block configurations in accordance with aspects of the present disclosure. In some cases, the resource configuration 300-*b* may be implemented by one or more aspects of the wireless communications system 100 or the wireless communications system 200. For example, a network entity 105, as described with reference to FIGS. 1 and 2 may transmit one or more SSBs 215 using the resource configuration 300-*b* to increase the frequency diversity of SSBs 215. The resource configuration 300-*b* may include one or more SSBs 215, which may be examples of the one or more SSBs 215 as described with reference to FIG. 2. The resource configuration 300-*b* may include one or more SSBs 215 allocated according to one or more time-frequency patterns.

Each SSB 215 of the resource configuration 300-*b* may be included in a subset 305-*c* or a subset 305-*d*. The subset 305-*c* may include an SSB 215-*h* and an SSB 215-*i*. The subset 305-*d* may include an SSB 215-*g* and an SSB 215-*j*. Each SSB 215 in the subset 305-*c* may be allocated according to a first time-frequency pattern and each SSB 215 in the subset 305-*d* may be allocated according to a second time-frequency pattern. For example, a network entity 105 may transmit each SSB 215 of the subset 305-*c* using a first bandwidth. Additionally, or alternatively, a network entity 105 may transmit each SSB 215 of the subset 305-*c* according to a first periodicity (e.g., a first repeating time allocation).

Each SSB 215 in the subset 305-*d* may be allocated according to a second time-frequency pattern. For example, a network entity 105 may transmit each SSB 215 of the subset 305-*d* using a second bandwidth different than the first bandwidth. In some cases, the first bandwidth may be greater than the second bandwidth. In some other cases, the second bandwidth may be greater than the first bandwidth (not shown). In some cases, a network entity 105 may select frequency resources such that the second bandwidth is larger than a channel coherence. Additionally, or alternatively, a network entity 105 may transmit each SSB 215 of the subset 305-*d* according to a second periodicity (e.g., a second repeating time allocation). In some cases, the second periodicity may be different than the first periodicity. In some other cases, the second periodicity may be a same periodicity as the first periodicity (not shown).

In some cases, the network entity 105 may increase a bandwidth for an SSB 215 by increasing a subcarrier spacing (SCS) for the SSB 215 while maintaining the same payload (e.g., a PBCH payload 235). Additionally or alternatively, the network entity 105 may increase the bandwidth for an SSB 215 by maintaining the same numerology and increasing the number of SCS allocated to the SSB 215. In such cases, the network entity 105 may increase the size of the bandwidth to be larger than a channel coherence), which may increase frequency diversity of SSB 215 transmissions. Further, a network entity 105 may change a configuration for one or more empty REs 220 based on a bandwidth of an SSB 215.

Figure 4:
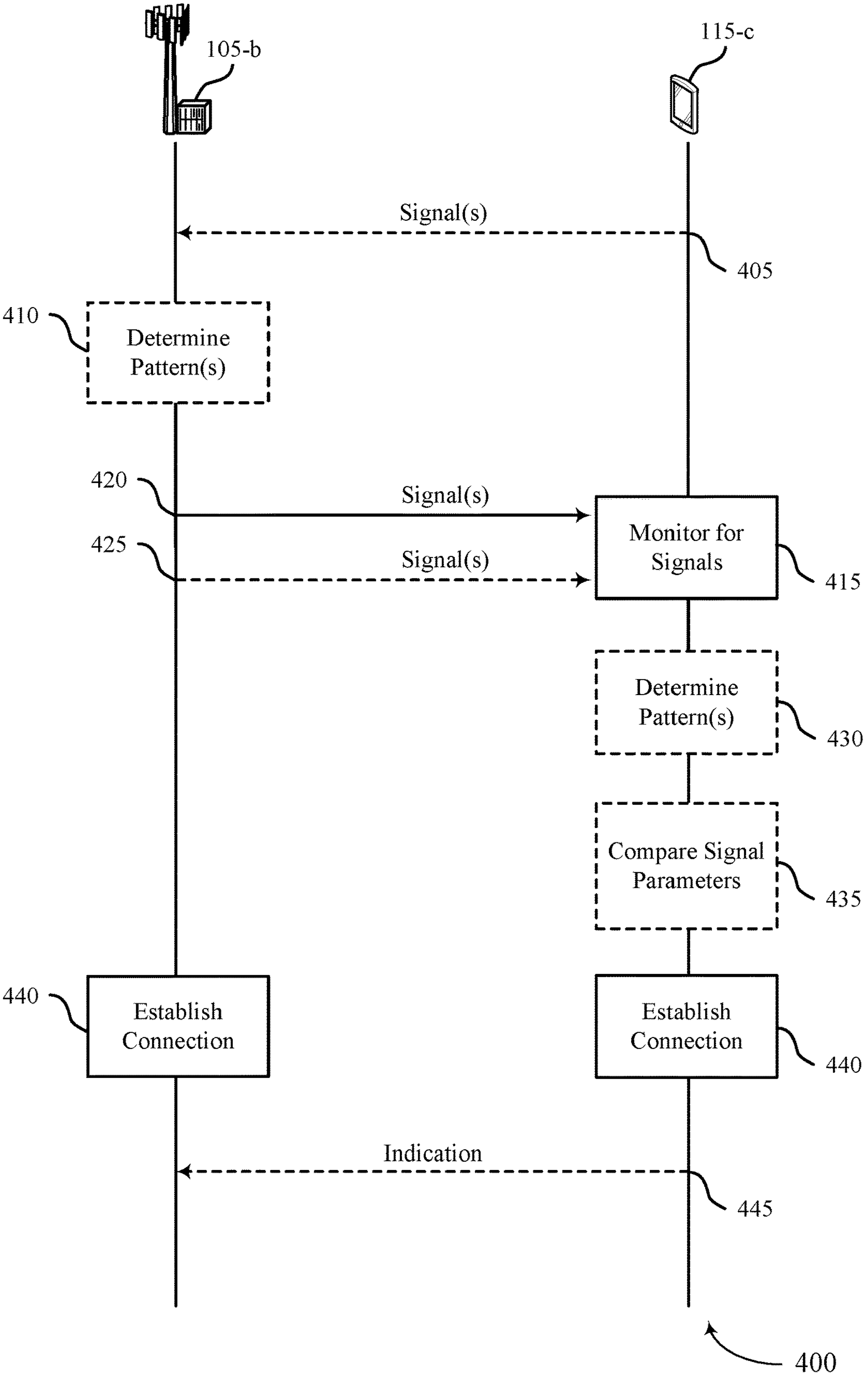
FIG. 4 illustrates an example of a process flow that supports synchronization signal block configurations in accordance with one or more aspects of the present disclosure.

FIG. 4 illustrates an example of a process flow 400 that supports synchronization signal block configurations. In some cases, the process flow 400 may implement aspects of the wireless communications system 100, the wireless communications system 200, and the resource configurations 300. For example, the process flow 400 may include a UE 115-*c*, which may be an example of corresponding UEs 115 as described with reference to FIGS. 1 and 2. Additionally, or alternatively, the process flow 400 may include a network entity 105-*b*, which may be an example of corresponding network entities 105 as described with reference to FIGS. 1 and 2. In some cases, the network entity 105-*b* may transmit one or more SSBs 215 according to one or more time-frequency patterns as described with reference to FIG. 3, which may increase reception quality for UE 115-*c* by creating frequency diversified SSB 215 transmissions.

In the following description of the process flow 400, the operations between the network entity 105-*b* and the UE 115-*c* may be performed in a different order than the order shown. Some operations may also be left out of the process flow 400, or other operations may be added to the process flow 400. Further, although some operations or communications may be shown to occur at different times for discussion purposes, these operations may occur at the same time. Additionally, or alternatively, although the network entity 105-*b* and the UE 115-*c* are shown performing a number of the operations of process flow 400, any wireless device may perform the operations shown.

At 405, the UE 115-*c* may transmit one or more reference signals to the network entity 105-*b*. The one or more reference signals may indicate one or more channel quality parameters. In some cases, the UE 115-*c* may transmit the one or more reference signals to determine channel quality information. In some cases, the UE 115-*c* may transmit the one or more reference signals periodically. Additionally, or alternatively, the UE 115-*c* may multicast (e.g., groupcast, broadcast) the one or more reference signals. The UE 115-*c* may transmit the one or more reference signals prior to establishing a connection with the network entity 105-*b*.

At 410, the network entity 105-*b* may determine a first time-frequency pattern based on the one or more channel quality parameters. For example, the network entity 105-*b* may receive the one or more reference signals from the UE 115-*c* and may determine one or more channel quality parameters for one or more channels. In some cases, the network entity 105-*b* may determine that a quality of a first channel is higher than a quality of a second channel. In some cases, the first time-frequency pattern (e.g., determined based on the one or more channel quality parameters) may be for transmitting one or more SSBs 215. Additionally or alternatively, the network entity 105-*b* may determine a second time-frequency pattern, based on a configuration. The second time-frequency pattern may be for transmitting one or more SSBs 215.

At 415, the UE 115-*c* may monitor for a set of synchronization signals (e.g., a set of SSBs 215). In some cases, the set of synchronization signals may include a first subset of synchronization signals allocated according to a first time-frequency pattern and a second subset of synchronization signals allocated according to a second time-frequency pattern. The second time-frequency pattern may be different from the first time-frequency pattern. The first subset of synchronization signals and the second subset of synchronization signals may be monitored during a first time interval. The UE 115-*c* may monitor a first set of time-frequency resources for the one or more synchronization signals of the set of synchronization signals. Additionally or alternatively, the UE 115-*c* may monitor a second set of time-frequency resources for the one or more synchronization signals of the set of synchronization signals.

The first time-frequency pattern may indicate one or more carrier-frequencies for the first subset of synchronization signals, one or more bandwidths for the first subset of synchronization signals, a periodicity for the first subset of synchronization signals, or any combination thereof. Additionally, or alternatively, the second time-frequency pattern may indicate one or more carrier-frequencies for the second subset of synchronization signals, one or more bandwidths for the second subset of synchronization signals, a periodicity for the second subset of synchronization signals, or any combination thereof.

In some cases, the first time-frequency pattern may correspond to a first frequency allocation of the first subset of synchronization signals on a first set of frequency resources and a first repeating time allocation according to a first periodicity. The second time-frequency pattern may correspond to a second frequency allocation of the second subset of synchronization signals on a second set of frequency resources and a second repeating time allocation according to a second periodicity. In some cases, the first set of frequency resources may be different than the second set of frequency resources and the first periodicity may be different than the second periodicity. Further, the one or more synchronization signals allocated to the first set of frequency resources may, at least partially, overlap in time with one or more synchronization signals allocated to the second set of frequency resources. The first set of frequency resources and the second set of frequency resources may be separated by a frequency bandwidth that is greater than a channel coherence of the first subset of synchronization signals.

In some other cases, the first time-frequency pattern may correspond to a first frequency allocation of the first subset of synchronization signals having a first bandwidth and a first repeating time allocation according to a first periodicity. The second time-frequency pattern may correspond to a second frequency allocation of the second subset of synchronization signals having a second bandwidth. In such cases, the first bandwidth may be different than the second bandwidth. For example, the first bandwidth may be greater than the second bandwidth, where the first bandwidth may be greater than a channel coherence of the first subset of synchronization signals.

At 420, the UE 115-*c* may receive, from the network entity 105-*b*, one or more synchronization signals of the set of synchronization signals. For example, the UE 115-*c* may receive one or more synchronization signals of the first subset of synchronization signals. The UE 115-*c* may monitor for and receive the one or more synchronization signals during the first time interval. The one or more synchronization signals of the first subset of synchronization signals may include an indication of the second time-frequency pattern. Additionally or alternatively, the UE 115-*c* may receive, from the network entity 105-*b*, the indication of the second time-frequency pattern via one or more signals not included in the one or more synchronization signals (e.g., in a system information block (SIB) or in other control signaling such as RRC signaling or the like).

At 425, the UE 115-*c* may receive, from the network entity 105-*b*, one or more synchronization signals of the second subset of synchronization signals. Each synchronization signal of the set of synchronization signals (e.g., the first subset of synchronization signals and the second subset of synchronization signals) may be an example of an SSB 215. In some cases, the UE 115-*b* may receive the first synchronization signal of the second subset of synchronization signals based on the indication of the second time-frequency pattern. In some cases, the UE 115-*c* may monitor for and receive the one or more synchronization signals of the second subset of synchronization signals during the first time interval.

At 430, the UE 115-*c* may determine the first time-frequency pattern, the second time-frequency pattern, or both, based on receiving the one or more synchronization signals. For example, the UE 115-*c* may perform one or more operations to determine a pattern for one or more time-frequency resources for receiving one or more synchronization signals. In such cases, the UE 115-*c* may not receive an indication of a time-frequency pattern from the network entity 105-*b*. Accordingly, the UE 115-*c* may determine (e.g., implicitly, without receiving an indication) the first time-frequency pattern, the second-time frequency pattern, or any other time-frequency pattern based on receiving the one or more synchronization signals. In some cases, the UE 115-*c* may determine to monitor one or more time-frequency resources based on determining the time-frequency pattern.

At 435, the UE 115-*c* may compare one or more parameters for synchronization signals (e.g., to determine a priority or to select one or more synchronization signals for communications). For example, the UE 115-*c* may compare one or more parameters for the first synchronization signal of the first subset with one or more parameters for the first synchronization signal of the second subset. The UE 115-*c* may select which synchronization signal (e.g., from the first subset or from the second subset) is associated with higher quality communications (e.g., with the network entity 105-*b*).

At 440, the UE 115-*c* may establish a connection with the network entity 105-*b* based on receiving the one or more synchronization signals. Additionally or alternatively, the network entity 105-*b* may establish a connection with the UE 115-*c* based on transmitting the one or more synchronization signals. For example, the UE 115-*c* may receive one or more synchronization signals of the first subset of synchronization signals, the second subset of synchronization signals, or both, and may establish a connection with the network entity 105-*b* based on receiving the one or more synchronization signals. In some cases, the UE 115-*c* may perform one or more operations to maintain a connection with the network entity 105-*b* based on receiving the one or more synchronization signals. For example, the UE 115-*c* may perform one or more operations to synchronize communications with the network entity 105-*b* based on receiving the one or more synchronization signals.

At 445, the UE 115-*c* may transmit, to the network entity 105-*b*, a message that indicates whether to transmit subsequent messages (e.g., downlink data or control messages) using the first time-frequency pattern, the second time-frequency pattern, or both, based on the comparison performed at 435. For example, the UE 115-*c* may determine that communication quality is improved for synchronization signals using the first time-frequency pattern, the second time-frequency pattern, or both. Accordingly, the UE 115-*c* may transmit an indication to the network entity 105-*b* that indicates whether the network entity 105-*b* should transmit synchronization signals using the first time-frequency pattern, the second time-frequency pattern, or both.

Figure 5:
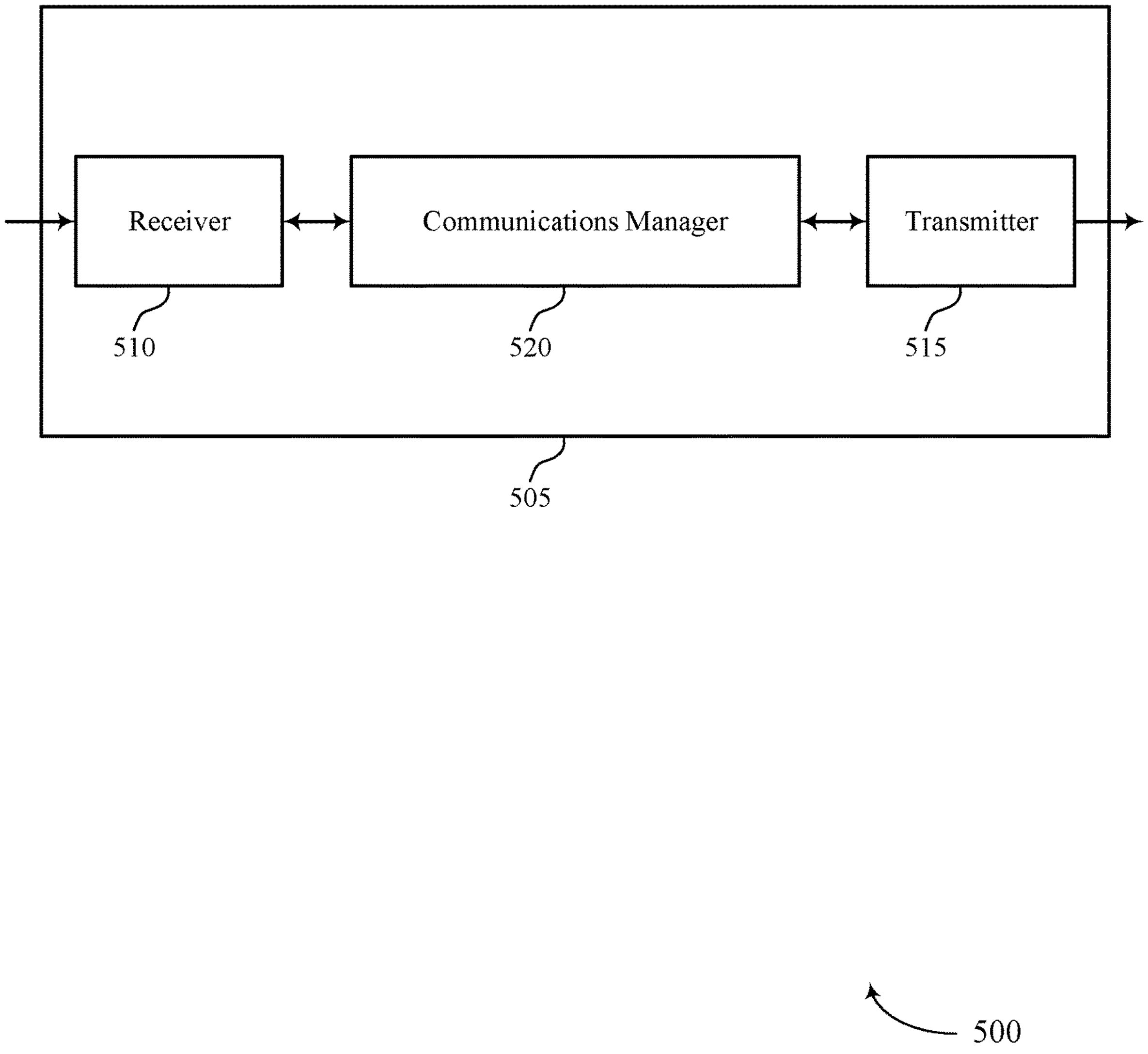
FIGS. 5 and 6 show block diagrams of devices that support synchronization signal block configurations in accordance with one or more aspects of the present disclosure.

FIG. 5 shows a block diagram 500 of a device 505 that supports synchronization signal block configurations in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to synchronization signal block configurations). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to synchronization signal block configurations). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of synchronization signal block configurations as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for monitoring for a set of synchronization signals that includes a first subset of synchronization signals that are allocated according to a first time-frequency pattern and a second subset of synchronization signals that are allocated according to a second time-frequency pattern that is different than the first time-frequency pattern, where the first subset of synchronization signals and the second subset of synchronization signals are monitored during a first time interval. The communications manager 520 may be configured as or otherwise support a means for receiving one or more synchronization signals of the set of synchronization signals based on the monitoring. The communications manager 520 may be configured as or otherwise support a means for establishing a connection with a network entity based on receiving the one or more synchronization signals.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more effective utilization of communication resources. For example, the device 505 may determine one or more time-frequency patterns for receiving synchronization signals more effectively. In some cases, the device 505 may determine to monitor for time-frequency resources according to the one or more determined time-frequency patterns, which may conserve communication resources. Additionally, or alternatively, monitoring for synchronization signals according to the one or more time-frequency patterns may enable the device 505 to more effectively receive transmissions and establish connections with other devices, which may reduce processing resources and power consumption.

Figure 6:
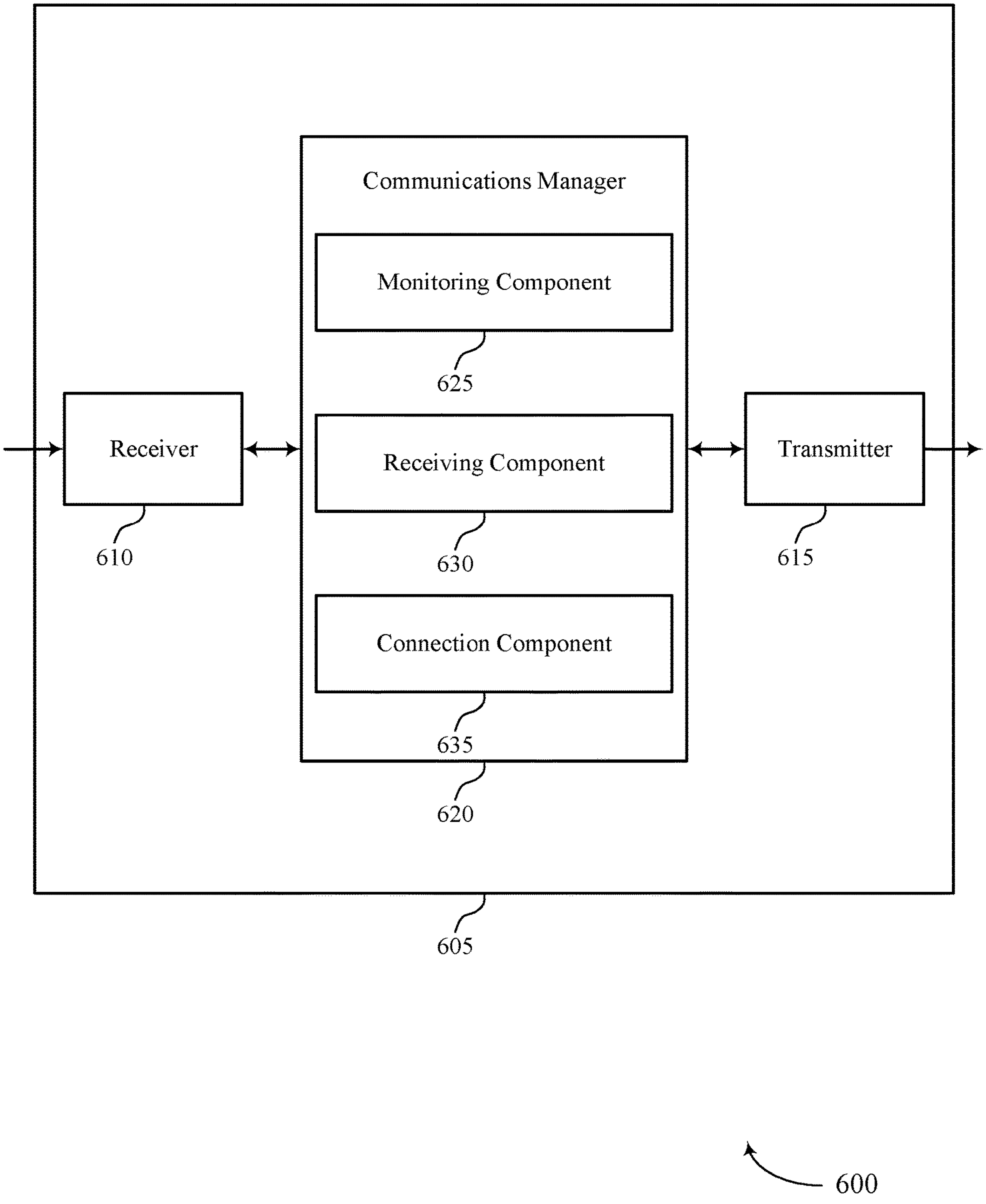

FIG. 6 shows a block diagram 600 of a device 605 that supports synchronization signal block configurations in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to synchronization signal block configurations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to synchronization signal block configurations). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of synchronization signal block configurations as described herein. For example, the communications manager 620 may include a monitoring component 625, a receiving component 630, a connection component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The monitoring component 625 may be configured as or otherwise support a means for monitoring for a set of synchronization signals that includes a first subset of synchronization signals that are allocated according to a first time-frequency pattern and a second subset of synchronization signals that are allocated according to a second time-frequency pattern that is different than the first time-frequency pattern, where the first subset of synchronization signals and the second subset of synchronization signals are monitored during a first time interval. The receiving component 630 may be configured as or otherwise support a means for receiving one or more synchronization signals of the set of synchronization signals based on the monitoring. The connection component 635 may be configured as or otherwise support a means for establishing a connection with a network entity based on receiving the one or more synchronization signals.

Figure 7:
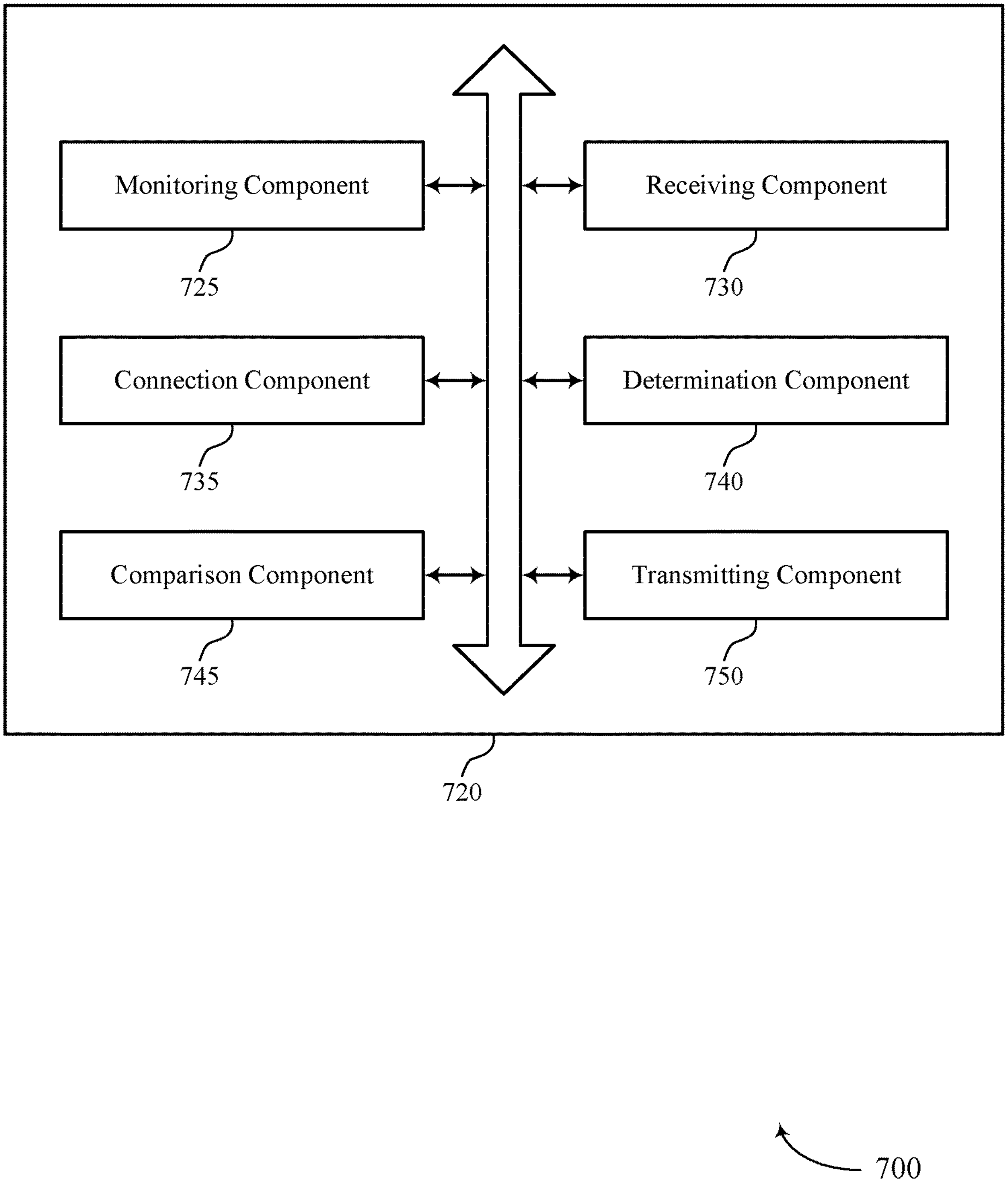
FIG. 7 shows a block diagram of a communications manager that supports synchronization signal block configurations in accordance with one or more aspects of the present disclosure.

FIG. 7 shows a block diagram 700 of a communications manager 720 that supports synchronization signal block configurations in accordance with one or more aspects of the present disclosure. The communications manager 720 may be an example of aspects of a communications manager 520, a communications manager 620, or both, as described herein. The communications manager 720, or various components thereof, may be an example of means for performing various aspects of synchronization signal block configurations as described herein. For example, the communications manager 720 may include a monitoring component 725, a receiving component 730, a connection component 735, a determination component 740, a comparison component 745, a transmitting component 750, or any combination thereof. Each of these components may communicate, directly or indirectly, with one another (e.g., via one or more buses).

The communications manager 720 may support wireless communications at a UE in accordance with examples as disclosed herein. The monitoring component 725 may be configured as or otherwise support a means for monitoring for a set of synchronization signals that includes a first subset of synchronization signals that are allocated according to a first time-frequency pattern and a second subset of synchronization signals that are allocated according to a second time-frequency pattern that is different than the first time-frequency pattern, where the first subset of synchronization signals and the second subset of synchronization signals are monitored during a first time interval. The receiving component 730 may be configured as or otherwise support a means for receiving one or more synchronization signals of the set of synchronization signals based on the monitoring. The connection component 735 may be configured as or otherwise support a means for establishing a connection with a network entity based on receiving the one or more synchronization signals.

In some examples, the receiving component 730 may be configured as or otherwise support a means for receiving an indication of the second time-frequency pattern from one or more synchronization signals of the first subset of synchronization signals.

In some examples, the first time-frequency pattern corresponds to a first frequency allocation of the first subset of synchronization signals on a first set of frequency resources and a first repeating time allocation according to a first periodicity. In some examples, the second time-frequency pattern corresponds to a second frequency allocation of the second subset of synchronization signals on a second set of frequency resources and a second repeating time allocation according to a second periodicity. In some examples, the first set of frequency resources is different than the second set of frequency resources.

In some examples, one or more synchronization signals allocated to the first set of frequency resources at least partially overlap in time with one or more synchronization signals allocated to the second set of frequency resources.

In some examples, the first periodicity is different than the second periodicity.

In some examples, the first set of frequency resources and the second set of frequency resources are separated by a frequency bandwidth that is greater than a channel coherence associated with the first subset of synchronization signals.

In some examples, the first time-frequency pattern corresponds to a first frequency allocation of the first subset of synchronization signals having a first bandwidth and a first repeating time allocation according to a first periodicity. In some examples, the second time-frequency pattern corresponds to a second frequency allocation of the second subset of synchronization signals having a second bandwidth. In some examples, the first bandwidth is different than the second bandwidth.

In some examples, the first bandwidth is greater than the second bandwidth. In some examples, the first bandwidth is greater than a channel coherence associated with the first subset of synchronization signals.

In some examples, to support monitoring for the set of synchronization signals, the monitoring component 725 may be configured as or otherwise support a means for monitoring a first set of time-frequency resources for the one or more synchronization signals of the set of synchronization signals. In some examples, to support monitoring for the set of synchronization signals, the monitoring component 725 may be configured as or otherwise support a means for monitoring a second set of time-frequency resources for the one or more synchronization signals of the set of synchronization signals.

In some examples, the determination component 740 may be configured as or otherwise support a means for determining the first time-frequency pattern, the second time-frequency pattern, or both, based on receiving the one or more synchronization signals.

In some examples, to support receiving the one or more synchronization signals from the set of synchronization signals, the receiving component 730 may be configured as or otherwise support a means for receiving a first synchronization signal of the first subset of synchronization signals. In some examples, to support receiving the one or more synchronization signals from the set of synchronization signals, the receiving component 730 may be configured as or otherwise support a means for receiving a first synchronization signal of the second subset of synchronization signals. In some examples, to support receiving the one or more synchronization signals from the set of synchronization signals, the comparison component 745 may be configured as or otherwise support a means for comparing one or more parameters for the first synchronization signal of the first subset with one or more parameters for the first synchronization signal of the second subset. In some examples, to support receiving the one or more synchronization signals from the set of synchronization signals, the transmitting component 750 may be configured as or otherwise support a means for transmitting a message to the network entity that indicates whether to transmit subsequent messages using the first time-frequency pattern, the second time-frequency pattern, or both, based on the comparing.

In some examples, the transmitting component 750 may be configured as or otherwise support a means for transmitting, to the network entity, one or more reference signals indicating one or more channel quality parameters, where the first time-frequency pattern is based on the one or more channel quality parameters.

In some examples, the first time-frequency pattern indicates one or more carrier-frequencies for the first subset of synchronization signals, one or more bandwidths for the first subset of synchronization signals, a periodicity for the first subset of synchronization signals, or any combination thereof. In some examples, the second time-frequency pattern indicates one or more carrier-frequencies for the second subset of synchronization signals, one or more bandwidths for the second subset of synchronization signals, a periodicity for the second subset of synchronization signals, or any combination thereof.

In some examples, each synchronization signal of the set of synchronization signals includes a synchronization signal block (SSB).

Figure 8:
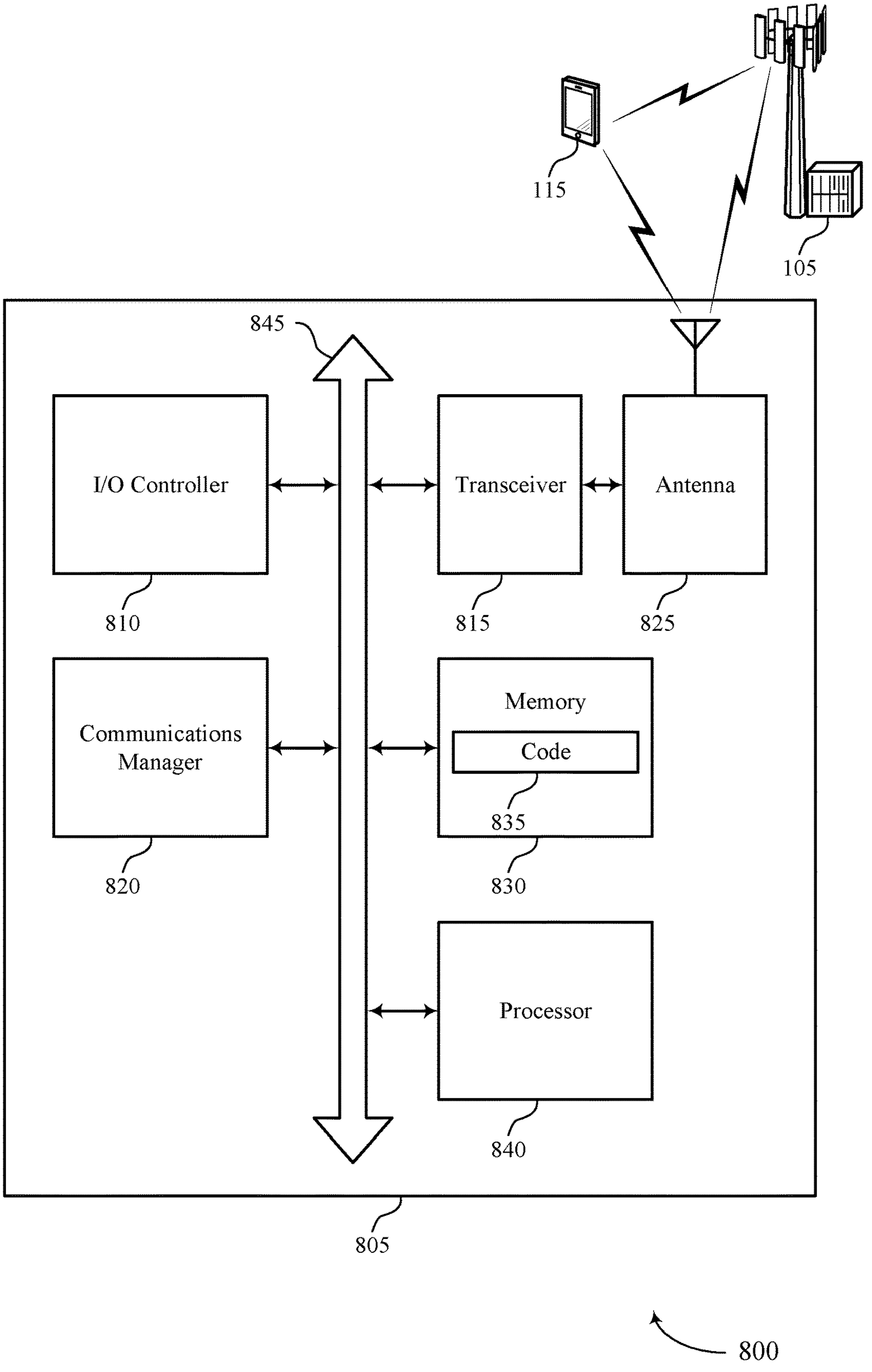
FIG. 8 shows a diagram of a system including a device that supports synchronization signal block configurations in accordance with one or more aspects of the present disclosure.

FIG. 8 shows a diagram of a system 800 including a device 805 that supports synchronization signal block configurations in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting synchronization signal block configurations). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for monitoring for a set of synchronization signals that includes a first subset of synchronization signals that are allocated according to a first time-frequency pattern and a second subset of synchronization signals that are allocated according to a second time-frequency pattern that is different than the first time-frequency pattern, where the first subset of synchronization signals and the second subset of synchronization signals are monitored during a first time interval. The communications manager 820 may be configured as or otherwise support a means for receiving one or more synchronization signals of the set of synchronization signals based on the monitoring. The communications manager 820 may be configured as or otherwise support a means for establishing a connection with a network entity based on receiving the one or more synchronization signals.

By including or configuring the communications manager 820 in accordance with examples as described herein, the device 805 may support techniques for improving communication reliability and more efficient utilization of communication resources. For example, the device 805 may determine time-frequency resources that provide improved synchronization signal communications. The device 805 may monitor for synchronization signals using the time-frequency resources, which may improve communication reliability. For example, a first set of time-frequency resources (e.g., a first pattern for time-frequency resources) may be associated with improved reception efficiency at the device 805 when compared to a second set of time-frequency resources (e.g., a second pattern for time-frequency resources). In some other cases, the device 805 may determine to monitor multiple sets of time-frequency resources, which may increase an average power of received synchronization signals.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of synchronization signal block configurations as described herein, or the processor 840 and the memory 830 may be otherwise configured to perform or support such operations.

Figure 9:
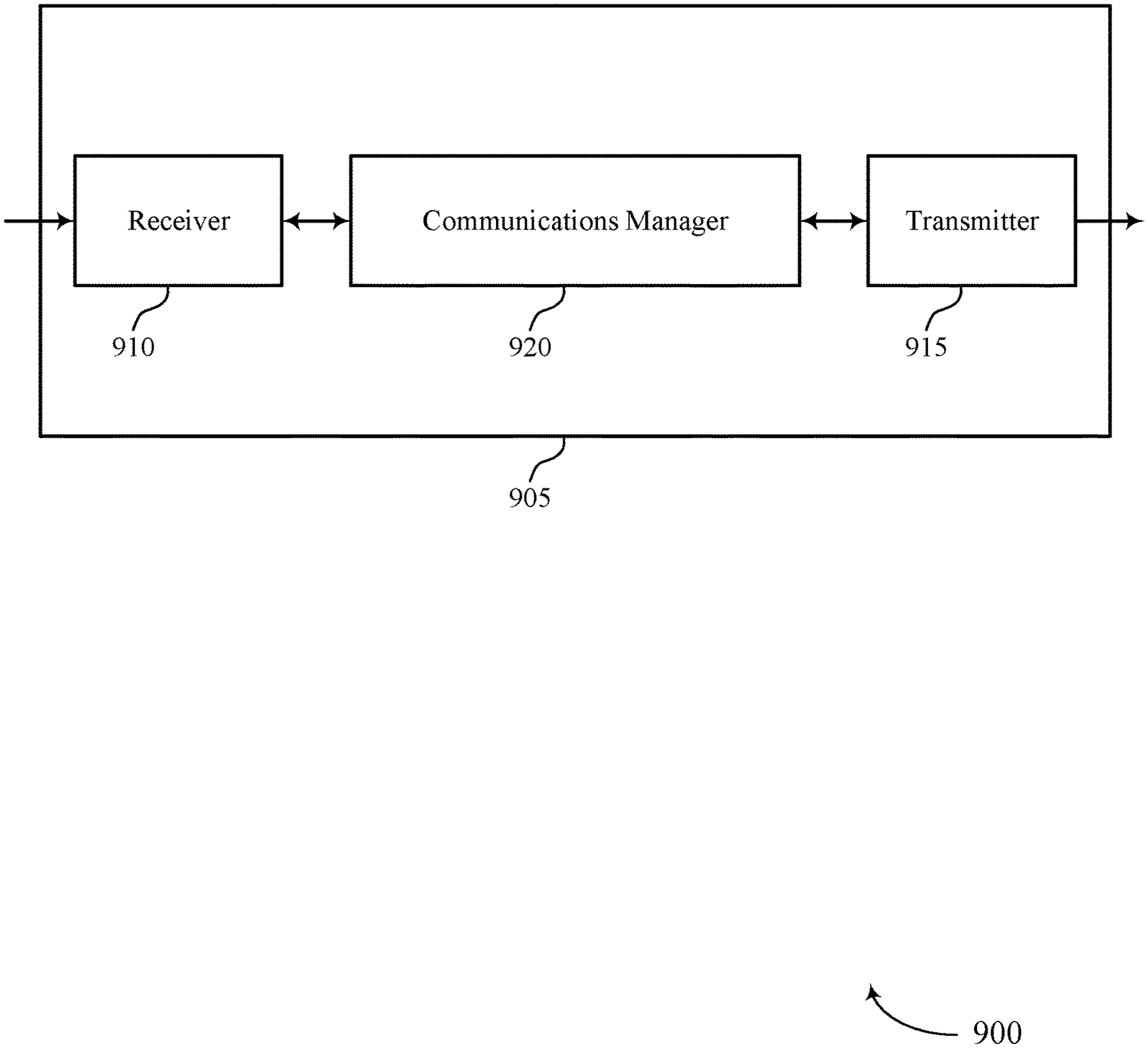
FIGS. 9 and 10 show block diagrams of devices that support synchronization signal block configurations in accordance with one or more aspects of the present disclosure.

FIG. 9 shows a block diagram 900 of a device 905 that supports synchronization signal block configurations in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of synchronization signal block configurations as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for transmitting a first subset of synchronization signals based on a first time-frequency pattern. The communications manager 920 may be configured as or otherwise support a means for transmitting a second subset of synchronization signals based on a second time-frequency pattern different than the first time-frequency pattern, where the first subset of synchronization signals and the second subset of synchronization signals are transmitted during a first time interval. The communications manager 920 may be configured as or otherwise support a means for establishing a connection with a UE based on transmitting the first subset of synchronization signals, the second subset of synchronization signals, or both.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more effective utilization of communication resources. For example, the device 905 may determine one or more time-frequency patterns for transmitting synchronization signals more effectively. In some cases, the device 905 may determine time-frequency resources for transmitting synchronization signals based on the one or more determined time-frequency patterns, which may conserve communication resources. Additionally, or alternatively, transmitting synchronization signals according to the one or more time-frequency patterns may enable the device 905 to more effectively establish connections with other devices, which may reduce processing resources and power consumption.

Figure 10:
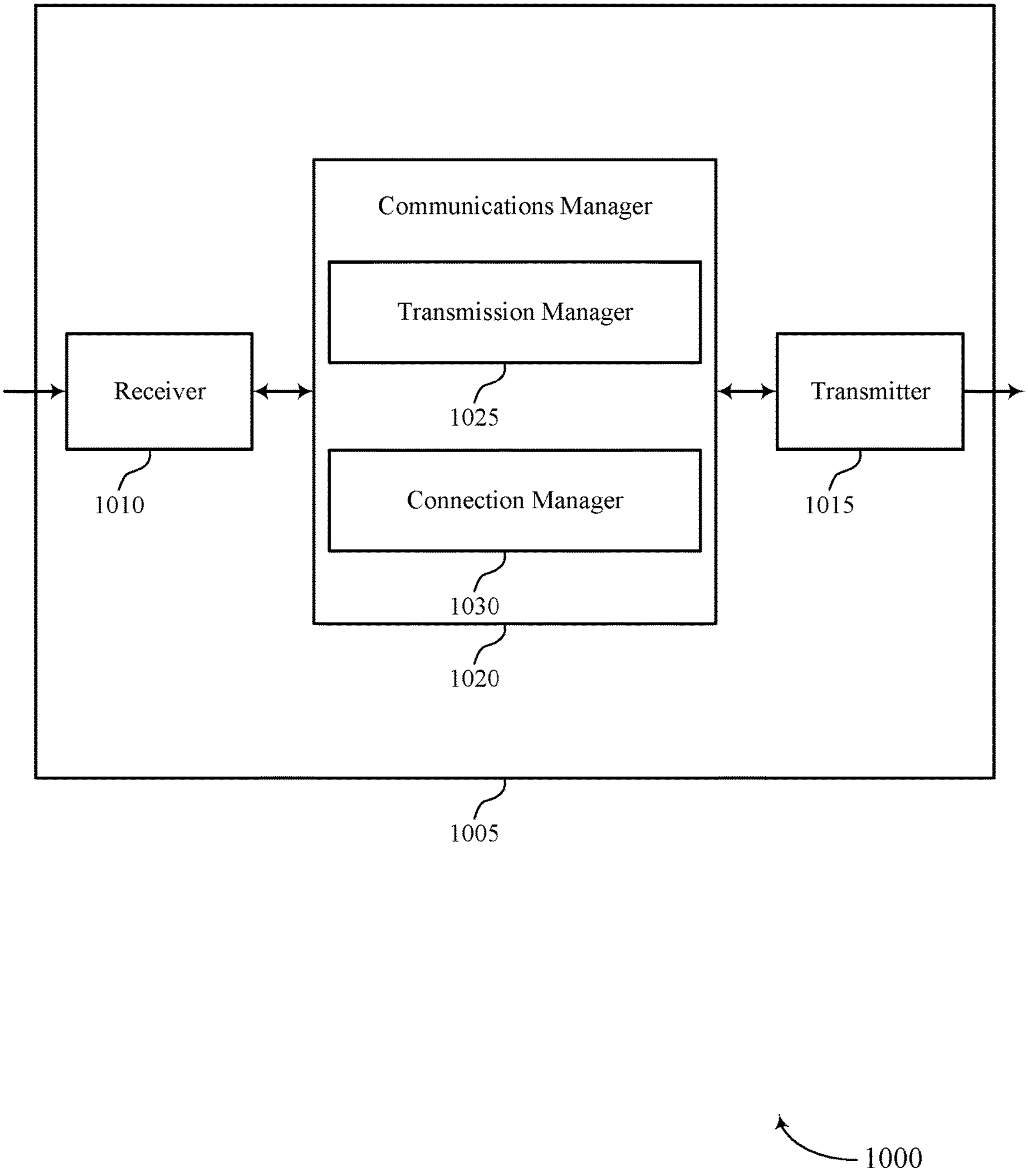

FIG. 10 shows a block diagram 1000 of a device 1005 that supports synchronization signal block configurations in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of synchronization signal block configurations as described herein. For example, the communications manager 1020 may include a transmission manager 1025 a connection manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The transmission manager 1025 may be configured as or otherwise support a means for transmitting a first subset of synchronization signals based on a first time-frequency pattern. The transmission manager 1025 may be configured as or otherwise support a means for transmitting a second subset of synchronization signals based on a second time-frequency pattern different than the first time-frequency pattern, where the first subset of synchronization signals and the second subset of synchronization signals are transmitted during a first time interval. The connection manager 1030 may be configured as or otherwise support a means for establishing a connection with a UE based on transmitting the first subset of synchronization signals, the second subset of synchronization signals, or both.

Figure 11:
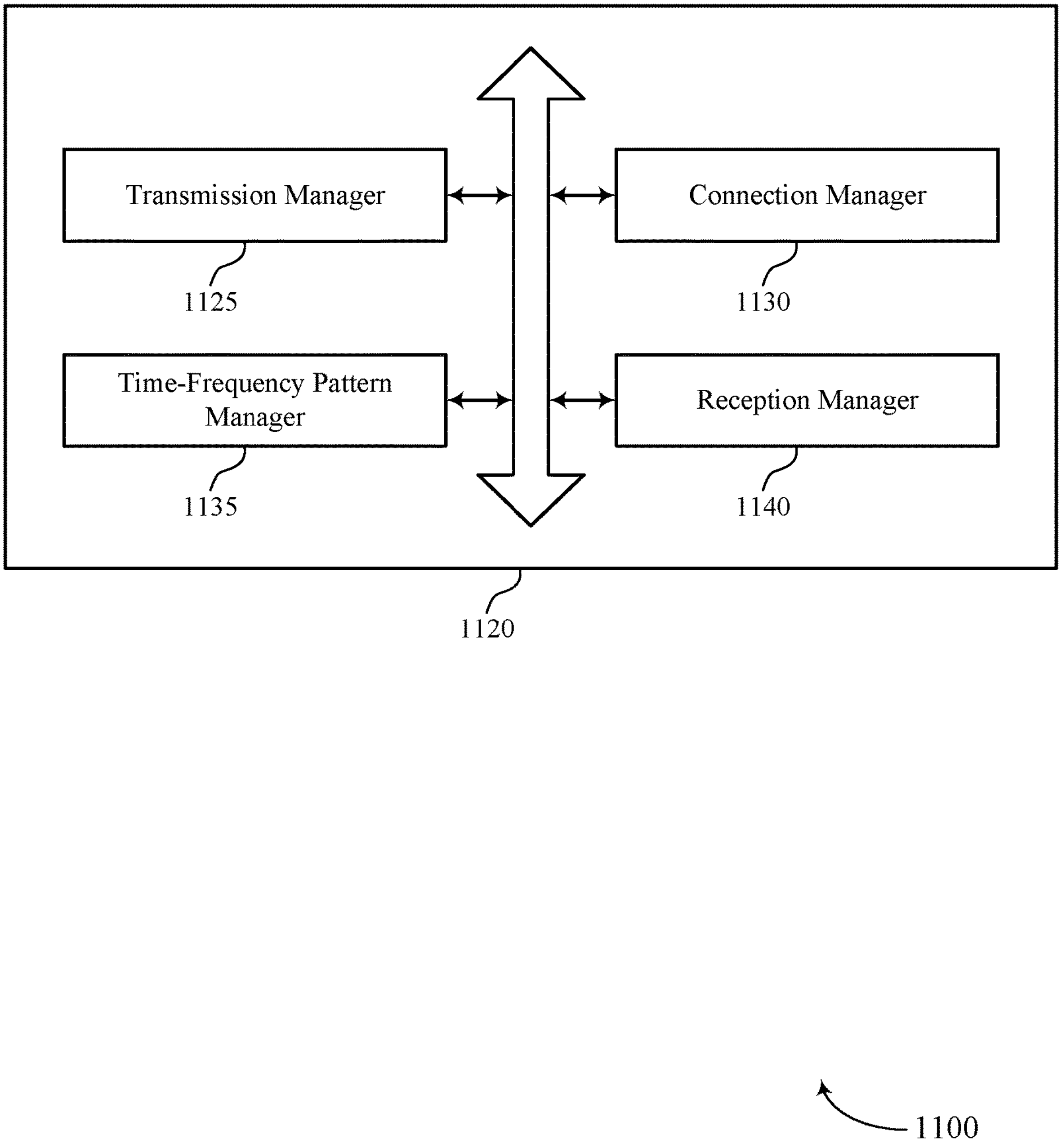
FIG. 11 shows a block diagram of a communications manager that supports synchronization signal block configurations in accordance with one or more aspects of the present disclosure.

FIG. 11 shows a block diagram 1100 of a communications manager 1120 that supports synchronization signal block configurations in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of synchronization signal block configurations as described herein. For example, the communications manager 1120 may include a transmission manager 1125, a connection manager 1130, a time-frequency pattern manager 1135, a reception manager 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The transmission manager 1125 may be configured as or otherwise support a means for transmitting a first subset of synchronization signals based on a first time-frequency pattern. In some examples, the transmission manager 1125 may be configured as or otherwise support a means for transmitting a second subset of synchronization signals based on a second time-frequency pattern different than the first time-frequency pattern, where the first subset of synchronization signals and the second subset of synchronization signals are transmitted during a first time interval. The connection manager 1130 may be configured as or otherwise support a means for establishing a connection with a UE based on transmitting the first subset of synchronization signals, the second subset of synchronization signals, or both.

In some examples, to support transmitting the first subset of synchronization signals, the transmission manager 1125 may be configured as or otherwise support a means for transmitting an indication of the second time-frequency pattern, where one or more synchronization signals of the first subset of synchronization signals includes the indication.

In some examples, the first time-frequency pattern corresponds to a first frequency allocation of the first subset of synchronization signals on a first set of frequency resources and a first repeating time allocation according to a first periodicity. In some examples, the second time-frequency pattern corresponds to a second frequency allocation of the second subset of synchronization signals on a second set of frequency resources and a second repeating time allocation according to a second periodicity. In some examples, the first set of frequency resources is different than the second set of frequency resources.

In some examples, one or more synchronization signals allocated to the first set of frequency resources overlap in time with one or more synchronization signals allocated to the second set of frequency resources.

In some examples, the first periodicity is different than the second periodicity.

In some examples, the first set of frequency resources and the second set of frequency resources are separated by a frequency bandwidth that is greater than a channel coherence associated with the first subset of synchronization signals.

In some examples, the first time-frequency pattern corresponds to a first frequency allocation of the first subset of synchronization signals having a first bandwidth and a first repeating time allocation according to a first periodicity. In some examples, the second time-frequency pattern corresponds to a second frequency allocation of the second subset of synchronization signals having a second bandwidth. In some examples, the first bandwidth is different than the second bandwidth.

In some examples, the first bandwidth is greater than the second bandwidth. In some examples, the first bandwidth is greater than a channel coherence associated with the first subset of synchronization signals.

In some examples, the time-frequency pattern manager 1135 may be configured as or otherwise support a means for determining the first time-frequency pattern, the second time-frequency pattern, or both, based on a configuration.

In some examples, the reception manager 1140 may be configured as or otherwise support a means for receiving a message from the UE that indicates whether to transmit subsequent messages using the first time-frequency pattern, the second time-frequency pattern, or both.

In some examples, the reception manager 1140 may be configured as or otherwise support a means for receiving, from the UE, one or more reference signals indicating one or more channel quality parameters. In some examples, the time-frequency pattern manager 1135 may be configured as or otherwise support a means for determining the first time-frequency pattern based on the one or more channel quality parameters.

In some examples, the first time-frequency pattern indicates one or more carrier-frequencies for the first subset of synchronization signals, one or more bandwidths for the first subset of synchronization signals, a periodicity for the first subset of synchronization signals, or any combination thereof. In some examples, the second time-frequency pattern indicates one or more carrier-frequencies for the second subset of synchronization signals, one or more bandwidths for the second subset of synchronization signals, a periodicity for the second subset of synchronization signals, or any combination thereof.

In some examples, each synchronization signal of the first subset of synchronization signals and each synchronization signal of the second subset of synchronization signals includes a synchronization signal block (SSB).

Figure 12:
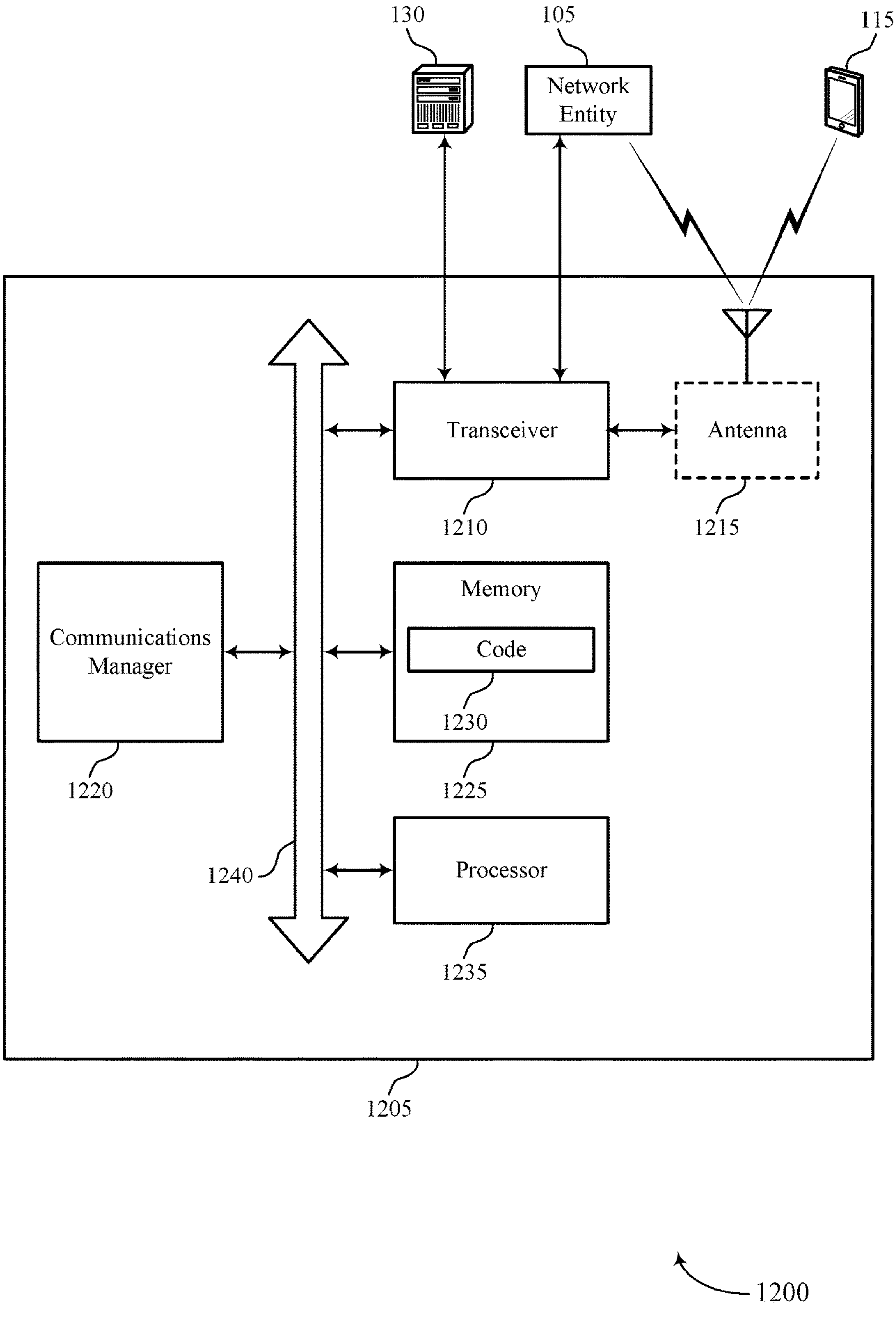
FIG. 12 shows a diagram of a system including a device that supports synchronization signal block configurations in accordance with one or more aspects of the present disclosure.

FIG. 12 shows a diagram of a system 1200 including a device 1205 that supports synchronization signal block configurations in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting synchronization signal block configurations). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for transmitting a first subset of synchronization signals based on a first time-frequency pattern. The communications manager 1220 may be configured as or otherwise support a means for transmitting a second subset of synchronization signals based on a second time-frequency pattern different than the first time-frequency pattern, where the first subset of synchronization signals and the second subset of synchronization signals are transmitted during a first time interval. The communications manager 1220 may be configured as or otherwise support a means for establishing a connection with a UE based on transmitting the first subset of synchronization signals, the second subset of synchronization signals, or both.

By including or configuring the communications manager 1220 in accordance with examples as described herein, the device 1205 may support techniques for improving communication reliability and more efficient utilization of communication resources. For example, the device 1205 may select time-frequency resources that provide improved synchronization signal communications. The device 1205 may transmit synchronization signals using the time-frequency resources, which may improve communication reliability. For example, a first set of time-frequency resources (e.g., a first pattern for time-frequency resources) may be associated with improved reception efficiency at a receiving device (e.g., a UE 115) when compared to a second set of time-frequency resources (e.g., a second pattern for time-frequency resources). In some cases, the device 1205 may determine to transmit synchronization signals using multiple sets of time-frequency resources, which may increase a probability that one or more synchronization signals is received.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of synchronization signal block configurations as described herein, or the processor 1235 and the memory 1225 may be otherwise configured to perform or support such operations.

Figure 13:
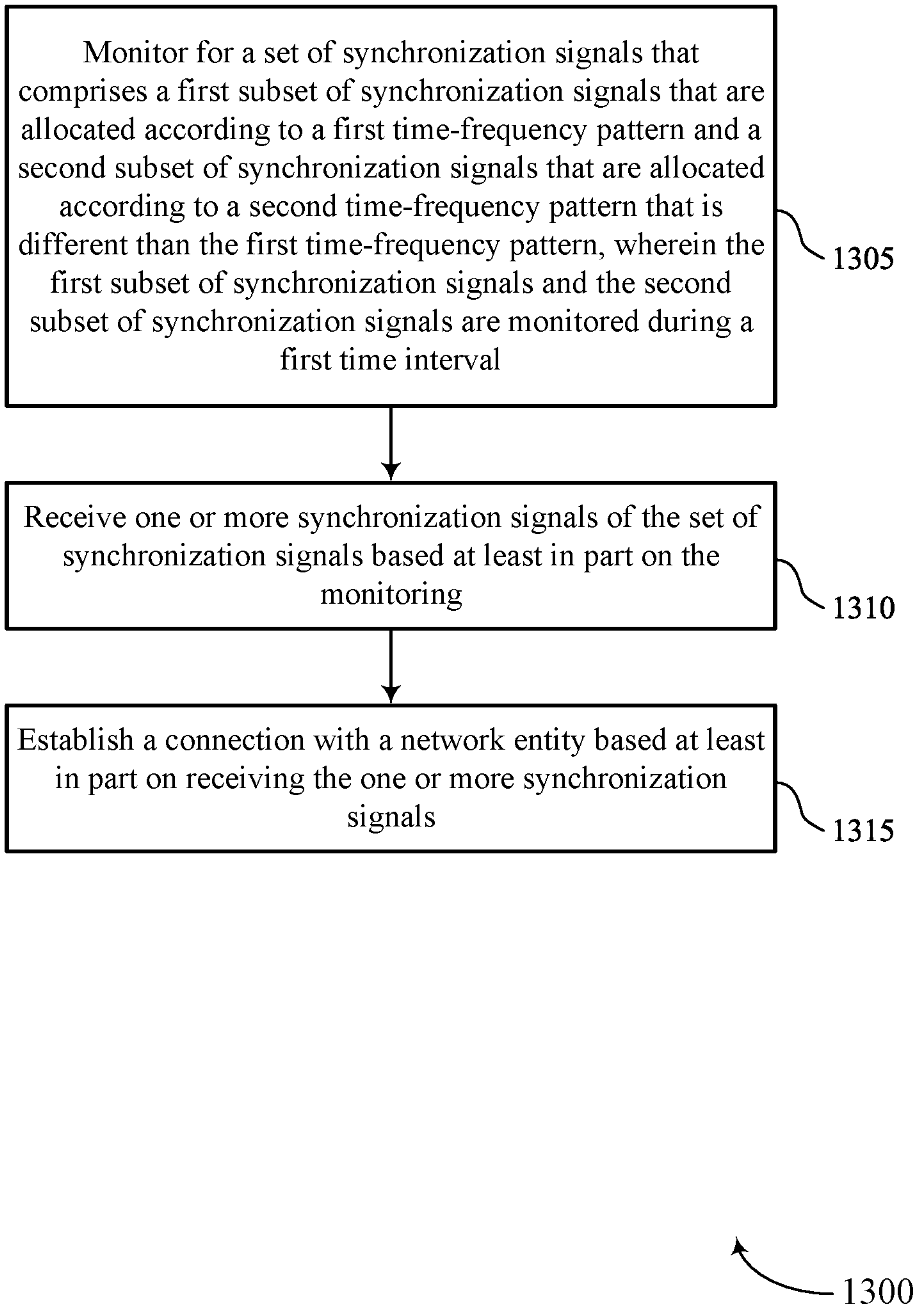
FIGS. 13 through 16 show flowcharts illustrating methods that support synchronization signal block configurations in accordance with one or more aspects of the present disclosure.

FIG. 13 shows a flowchart illustrating a method 1300 that supports synchronization signal block configurations in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include monitoring for a set of synchronization signals that includes a first subset of synchronization signals that are allocated according to a first time-frequency pattern and a second subset of synchronization signals that are allocated according to a second time-frequency pattern that is different than the first time-frequency pattern, where the first subset of synchronization signals and the second subset of synchronization signals are monitored during a first time interval. The operations of 1305 may be performed in accordance with examples as disclosed herein. In some examples, aspects of the operations of 1305 may be performed by a monitoring component 725 as described with reference to FIG. 7.

At 1310, the method may include receiving one or more synchronization signals of the set of synchronization signals based on the monitoring. The operations of 1310 may be performed in accordance with examples as disclosed herein. In some examples, aspects of the operations of 1310 may be performed by a receiving component 730 as described with reference to FIG. 7.

At 1315, the method may include establishing a connection with a network entity based on receiving the one or more synchronization signals. The operations of 1315 may be performed in accordance with examples as disclosed herein. In some examples, aspects of the operations of 1315 may be performed by a connection component 735 as described with reference to FIG. 7.

Figure 14:
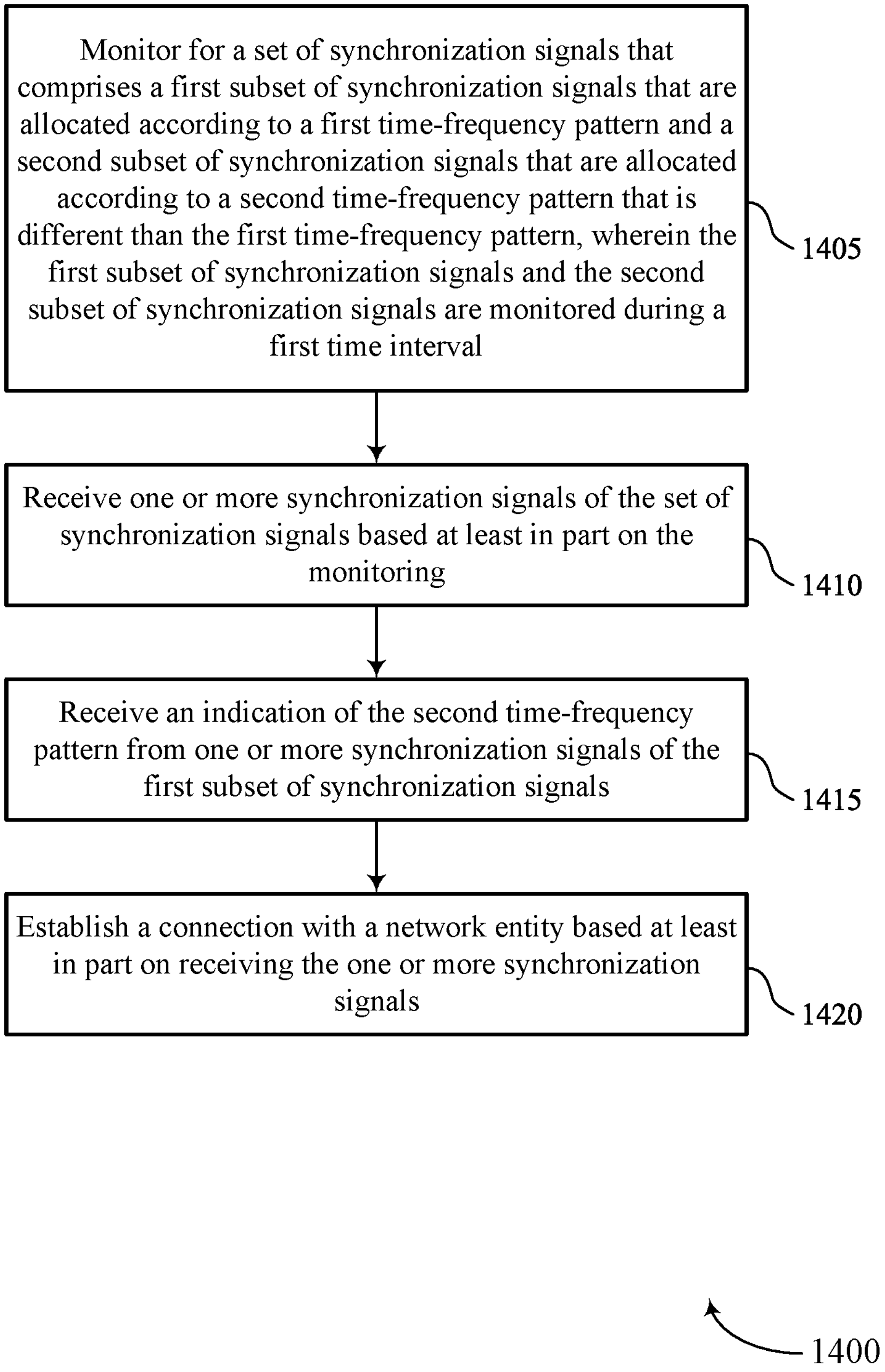

FIG. 14 shows a flowchart illustrating a method 1400 that supports synchronization signal block configurations in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include monitoring for a set of synchronization signals that includes a first subset of synchronization signals that are allocated according to a first time-frequency pattern and a second subset of synchronization signals that are allocated according to a second time-frequency pattern that is different than the first time-frequency pattern, where the first subset of synchronization signals and the second subset of synchronization signals are monitored during a first time interval. The operations of 1405 may be performed in accordance with examples as disclosed herein. In some examples, aspects of the operations of 1405 may be performed by a monitoring component 725 as described with reference to FIG. 7.

At 1410, the method may include receiving one or more synchronization signals of the set of synchronization signals based on the monitoring. The operations of 1410 may be performed in accordance with examples as disclosed herein. In some examples, aspects of the operations of 1410 may be performed by a receiving component 730 as described with reference to FIG. 7.

At 1415, the method may include receiving an indication of the second time-frequency pattern from one or more synchronization signals of the first subset of synchronization signals. The operations of 1415 may be performed in accordance with examples as disclosed herein. In some examples, aspects of the operations of 1415 may be performed by a receiving component 730 as described with reference to FIG. 7.

At 1420, the method may include establishing a connection with a network entity based on receiving the one or more synchronization signals. The operations of 1420 may be performed in accordance with examples as disclosed herein. In some examples, aspects of the operations of 1420 may be performed by a connection component 735 as described with reference to FIG. 7.

Figure 15:
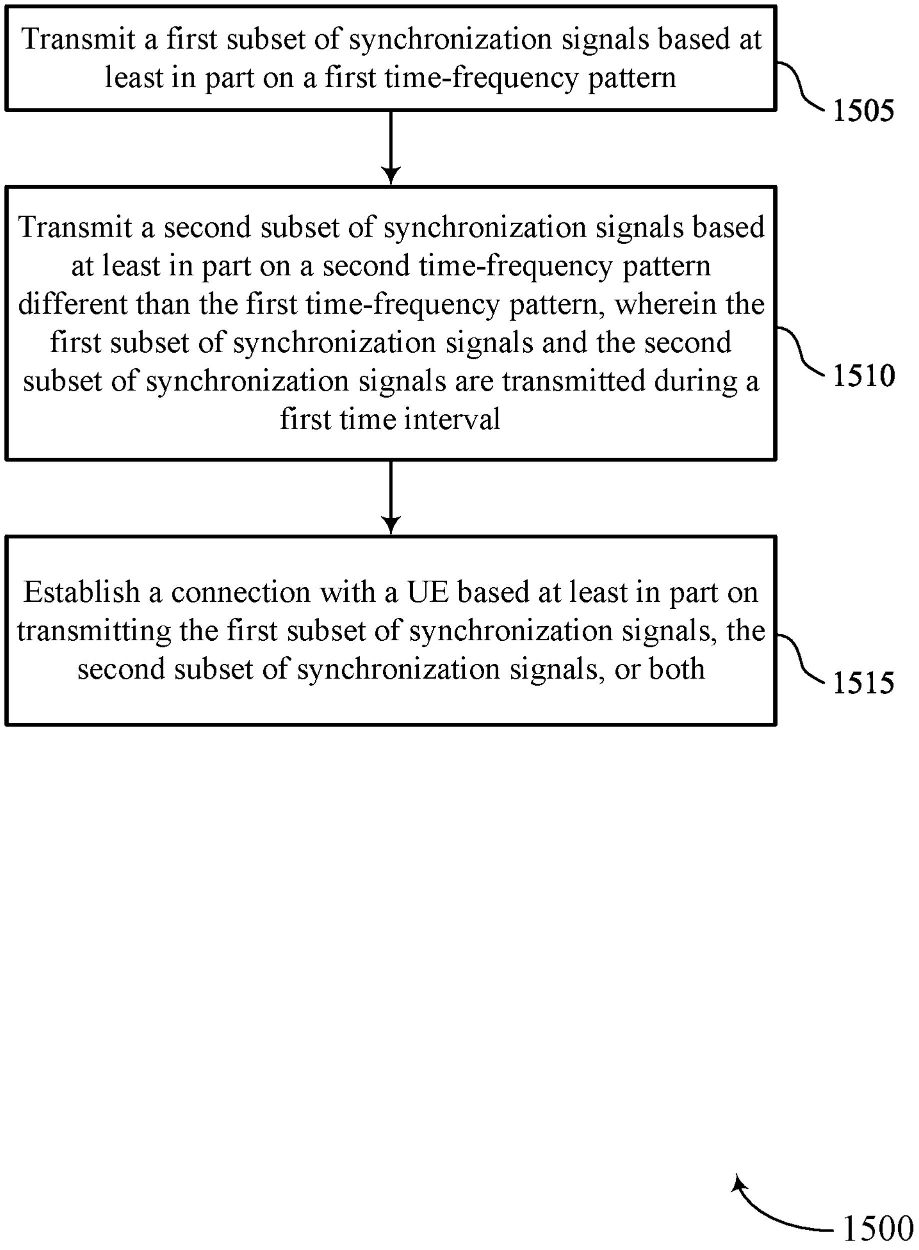

FIG. 15 shows a flowchart illustrating a method 1500 that supports synchronization signal block configurations in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting a first subset of synchronization signals based on a first time-frequency pattern. The operations of 1505 may be performed in accordance with examples as disclosed herein. In some examples, aspects of the operations of 1505 may be performed by a transmission manager 1125 as described with reference to FIG. 11.

At 1510, the method may include transmitting a second subset of synchronization signals based on a second time-frequency pattern different than the first time-frequency pattern, where the first subset of synchronization signals and the second subset of synchronization signals are transmitted during a first time interval. The operations of 1510 may be performed in accordance with examples as disclosed herein. In some examples, aspects of the operations of 1510 may be performed by a transmission manager 1125 as described with reference to FIG. 11.

At 1515, the method may include establishing a connection with a UE based on transmitting the first subset of synchronization signals, the second subset of synchronization signals, or both. The operations of 1515 may be performed in accordance with examples as disclosed herein. In some examples, aspects of the operations of 1515 may be performed by a connection manager 1130 as described with reference to FIG. 11.

Figure 16:
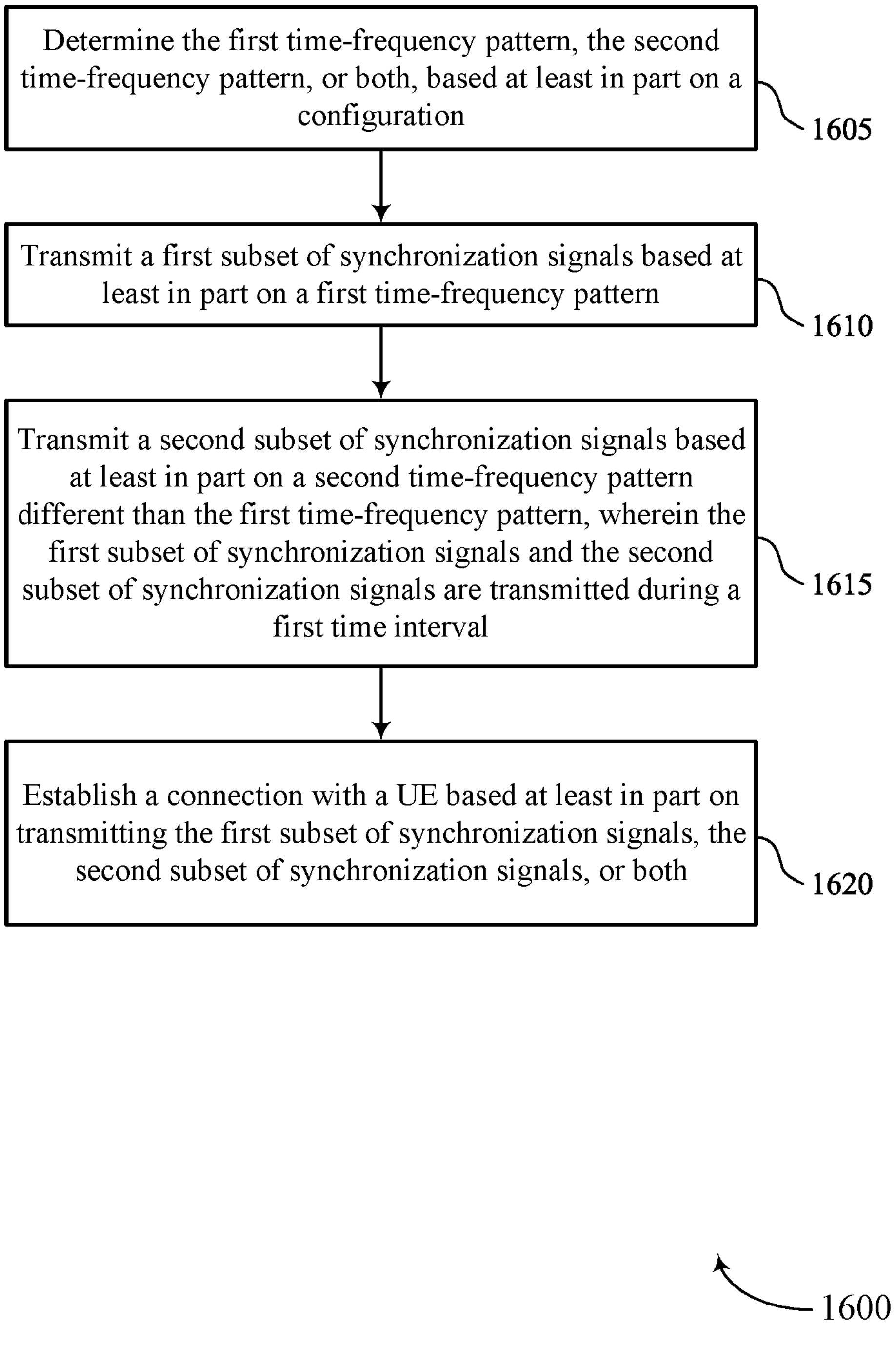

FIG. 16 shows a flowchart illustrating a method 1600 that supports synchronization signal block configurations in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include determining the first time-frequency pattern, the second time-frequency pattern, or both, based on a configuration. The operations of 1605 may be performed in accordance with examples as disclosed herein. In some examples, aspects of the operations of 1605 may be performed by a time-frequency pattern manager 1135 as described with reference to FIG. 11.

At 1610, the method may include transmitting a first subset of synchronization signals based on a first time-frequency pattern. The operations of 1610 may be performed in accordance with examples as disclosed herein. In some examples, aspects of the operations of 1610 may be performed by a transmission manager 1125 as described with reference to FIG. 11.

At 1615, the method may include transmitting a second subset of synchronization signals based on a second time-frequency pattern different than the first time-frequency pattern, where the first subset of synchronization signals and the second subset of synchronization signals are transmitted during a first time interval. The operations of 1615 may be performed in accordance with examples as disclosed herein. In some examples, aspects of the operations of 1615 may be performed by a transmission manager 1125 as described with reference to FIG. 11.

At 1620, the method may include establishing a connection with a UE based on transmitting the first subset of synchronization signals, the second subset of synchronization signals, or both. The operations of 1620 may be performed in accordance with examples as disclosed herein. In some examples, aspects of the operations of 1620 may be performed by a connection manager 1130 as described with reference to FIG. 11.

The following provides an overview of aspects of the present disclosure:

Aspect 1: A method for wireless communications at a UE, comprising: monitoring for a set of synchronization signals that comprises a first subset of synchronization signals that are allocated according to a first time-frequency pattern and a second subset of synchronization signals that are allocated according to a second time-frequency pattern that is different than the first time-frequency pattern, wherein the first subset of synchronization signals and the second subset of synchronization signals are monitored during a first time interval; receiving one or more synchronization signals of the set of synchronization signals based at least in part on the monitoring; and establishing a connection with a network entity based at least in part on receiving the one or more synchronization signals.

Aspect 2: The method of aspect 1, further comprising: receiving an indication of the second time-frequency pattern from one or more synchronization signals of the first subset of synchronization signals.

Aspect 3: The method of any of aspects 1 through 2, wherein the first time-frequency pattern corresponds to a first frequency allocation of the first subset of synchronization signals on a first set of frequency resources and a first repeating time allocation according to a first periodicity, and the second time-frequency pattern corresponds to a second frequency allocation of the second subset of synchronization signals on a second set of frequency resources and a second repeating time allocation according to a second periodicity, the first set of frequency resources is different than the second set of frequency resources.

Aspect 4: The method of aspect 3, wherein one or more synchronization signals allocated to the first set of frequency resources at least partially overlap in time with one or more synchronization signals allocated to the second set of frequency resources.

Aspect 5: The method of any of aspects 3 through 4, wherein the first periodicity is different than the second periodicity.

Aspect 6: The method of any of aspects 3 through 5, wherein the first set of frequency resources and the second set of frequency resources are separated by a frequency bandwidth that is greater than a channel coherence associated with the first subset of synchronization signals.

Aspect 7: The method of any of aspects 1 through 6, wherein the first time-frequency pattern corresponds to a first frequency allocation of the first subset of synchronization signals having a first bandwidth and a first repeating time allocation according to a first periodicity, and the second time-frequency pattern corresponds to a second frequency allocation of the second subset of synchronization signals having a second bandwidth, the first bandwidth is different than the second bandwidth.

Aspect 8: The method of aspect 7, wherein the first bandwidth is greater than the second bandwidth, and the first bandwidth is greater than a channel coherence associated with the first subset of synchronization signals.

Aspect 9: The method of any of aspects 1 through 8, wherein monitoring for the set of synchronization signals further comprises: monitoring a first set of time-frequency resources for the one or more synchronization signals of the set of synchronization signals; and monitoring a second set of time-frequency resources for the one or more synchronization signals of the set of synchronization signals.

Aspect 10: The method of any of aspects 1 through 9, further comprising: determining the first time-frequency pattern, the second time-frequency pattern, or both, based at least in part on receiving the one or more synchronization signals.

Aspect 11: The method of any of aspects 1 through 10, wherein receiving the one or more synchronization signals from the set of synchronization signals further comprises: receiving a first synchronization signal of the first subset of synchronization signals; receiving a first synchronization signal of the second subset of synchronization signals; comparing one or more parameters for the first synchronization signal of the first subset with one or more parameters for the first synchronization signal of the second subset; and transmitting a message to the network entity that indicates whether to transmit subsequent messages using the first time-frequency pattern, the second time-frequency pattern, or both, based at least in part on the comparing.

Aspect 12: The method of any of aspects 1 through 10, further comprising: transmitting, to the network entity, one or more reference signals indicating one or more channel quality parameters, wherein the first time-frequency pattern is based at least in part on the one or more channel quality parameters.

Aspect 13: The method of any of aspects 1 through 12, wherein the first time-frequency pattern indicates one or more carrier-frequencies for the first subset of synchronization signals, one or more bandwidths for the first subset of synchronization signals, a periodicity for the first subset of synchronization signals, or any combination thereof; and the second time-frequency pattern indicates one or more carrier-frequencies for the second subset of synchronization signals, one or more bandwidths for the second subset of synchronization signals, a periodicity for the second subset of synchronization signals, or any combination thereof.

Aspect 14: The method of any of aspects 1 through 13, wherein each synchronization signal of the set of synchronization signals comprises a synchronization signal block (SSB).

Aspect 15: A method for wireless communications at a network entity, comprising: transmitting a first subset of synchronization signals based at least in part on a first time-frequency pattern; transmitting a second subset of synchronization signals based at least in part on a second time-frequency pattern different than the first time-frequency pattern, wherein the first subset of synchronization signals and the second subset of synchronization signals are transmitted during a first time interval; and establishing a connection with a UE based at least in part on transmitting the first subset of synchronization signals, the second subset of synchronization signals, or both.

Aspect 16: The method of aspect 15, wherein transmitting the first subset of synchronization signals further comprises: transmitting an indication of the second time-frequency pattern, wherein one or more synchronization signals of the first subset of synchronization signals comprises the indication.

Aspect 17: The method of any of aspects 15 through 16, wherein the first time-frequency pattern corresponds to a first frequency allocation of the first subset of synchronization signals on a first set of frequency resources and a first repeating time allocation according to a first periodicity, and the second time-frequency pattern corresponds to a second frequency allocation of the second subset of synchronization signals on a second set of frequency resources and a second repeating time allocation according to a second periodicity, the first set of frequency resources is different than the second set of frequency resources.

Aspect 18: The method of aspect 17, wherein one or more synchronization signals allocated to the first set of frequency resources overlap in time with one or more synchronization signals allocated to the second set of frequency resources.

Aspect 19: The method of any of aspects 17 through 18, wherein the first periodicity is different than the second periodicity.

Aspect 20: The method of any of aspects 17 through 19, wherein the first set of frequency resources and the second set of frequency resources are separated by a frequency bandwidth that is greater than a channel coherence associated with the first subset of synchronization signals.

Aspect 21: The method of any of aspects 15 through 20, wherein the first time-frequency pattern corresponds to a first frequency allocation of the first subset of synchronization signals having a first bandwidth and a first repeating time allocation according to a first periodicity, and the second time-frequency pattern corresponds to a second frequency allocation of the second subset of synchronization signals having a second bandwidth, the first bandwidth is different than the second bandwidth.

Aspect 22: The method of aspect 21, wherein the first bandwidth is greater than the second bandwidth, and the first bandwidth is greater than a channel coherence associated with the first subset of synchronization signals.

Aspect 23: The method of any of aspects 15 through 22, further comprising: determining the first time-frequency pattern, the second time-frequency pattern, or both, based at least in part on a configuration.

Aspect 24: The method of any of aspects 15 through 23, further comprising: receiving a message from the UE that indicates whether to transmit subsequent messages using the first time-frequency pattern, the second time-frequency pattern, or both.

Aspect 25: The method of any of aspects 15 through 24, further comprising: receiving, from the UE, one or more reference signals indicating one or more channel quality parameters; and determining the first time-frequency pattern based at least in part on the one or more channel quality parameters.

Aspect 26: The method of any of aspects 15 through 25, wherein the first time-frequency pattern indicates one or more carrier-frequencies for the first subset of synchronization signals, one or more bandwidths for the first subset of synchronization signals, a periodicity for the first subset of synchronization signals, or any combination thereof; and the second time-frequency pattern indicates one or more carrier-frequencies for the second subset of synchronization signals, one or more bandwidths for the second subset of synchronization signals, a periodicity for the second subset of synchronization signals, or any combination thereof.

Aspect 27: The method of any of aspects 15 through 26, wherein each synchronization signal of the first subset of synchronization signals and each synchronization signal of the second subset of synchronization signals comprises a synchronization signal block (SSB).

Aspect 28: An apparatus for wireless communications at a UE, comprising a processor; memory coupled with the processor; and instructions stored in the memory and executable by the processor to cause the apparatus to perform a method of any of aspects 1 through 14.

Aspect 29: An apparatus for wireless communications at a UE, comprising at least one means for performing a method of any of aspects 1 through 14.

Aspect 30: A non-transitory computer-readable medium storing code for wireless communications at a UE, the code comprising instructions executable by a processor to perform a method of any of aspects 1 through 14.

Aspect 31: An apparatus for wireless communications at a network entity, comprising a processor; memory coupled with the processor; and instructions stored in the memory and executable by the processor to cause the apparatus to perform a method of any of aspects 15 through 27.

Aspect 32: An apparatus for wireless communications at a network entity, comprising at least one means for performing a method of any of aspects 15 through 27.

Aspect 33: A non-transitory computer-readable medium storing code for wireless communications at a network entity, the code comprising instructions executable by a processor to perform a method of any of aspects 15 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

monitoring for a set of synchronization signals that comprises a first subset of synchronization signals that are allocated according to a first time-frequency pattern and a second subset of synchronization signals that are allocated according to a second time-frequency pattern that is different than the first time-frequency pattern, wherein the first subset of synchronization signals and the second subset of synchronization signals are monitored during a first time interval, wherein each synchronization signal of the set of synchronization signals is a synchronization signal block (SSB) that comprises a physical broadcast channel payload, wherein the first time-frequency pattern corresponds to a first frequency allocation of the first subset of synchronization signals having a first bandwidth and a first periodicity, and the second time-frequency pattern corresponds to a second frequency allocation of the second subset of synchronization signals having a second bandwidth and a second periodicity, and wherein the first bandwidth and the second bandwidth are different or wherein the first frequency allocation and the second frequency allocation at least partially overlap in time and the first periodicity and the second periodicity are different;

receiving one or more synchronization signals of the set of synchronization signals based at least in part on the monitoring; and establishing a connection with a network entity based at least in part on receiving the one or more synchronization signals.

2. The method of claim 1, further comprising:

receiving an indication of the second time-frequency pattern from one or more synchronization signals of the first subset of synchronization signals.

3. The method of claim 1, wherein the first bandwidth and the second bandwidth are different, and wherein the first frequency allocation is non-overlapping in time with the second frequency allocation.

4. The method of claim 1, wherein the first frequency allocation and the second frequency allocation at least partially overlap in time and the first periodicity and the second periodicity are different.

5. The method of claim 1, wherein the first frequency allocation and the second frequency allocation are separated by a frequency bandwidth that is greater than a channel coherence associated with the first subset of synchronization signals.

6. The method of claim 1, wherein the first bandwidth is different than the second bandwidth, and wherein the first periodicity and the second periodicity are different.

7. The method of claim 6, wherein the first bandwidth is greater than the second bandwidth, and the first bandwidth is greater than a channel coherence associated with the first subset of synchronization signals.

8. The method of claim 1, wherein monitoring for the set of synchronization signals further comprises:

monitoring a first set of time-frequency resources for the one or more synchronization signals of the set of synchronization signals; and monitoring a second set of time-frequency resources for the one or more synchronization signals of the set of synchronization signals.

9. The method of claim 1, further comprising:

determining the first time-frequency pattern, the second time-frequency pattern, or both, based at least in part on receiving the one or more synchronization signals.

10. The method of claim 1, wherein receiving the one or more synchronization signals from the set of synchronization signals further comprises:

receiving a first synchronization signal of the first subset of synchronization signals;

receiving a first synchronization signal of the second subset of synchronization signals;

comparing one or more parameters for the first synchronization signal of the first subset of synchronization signals with one or more parameters for the first synchronization signal of the second subset of synchronization signals; and transmitting a message to the network entity that indicates whether to transmit subsequent messages using the first time-frequency pattern, the second time-frequency pattern, or both, based at least in part on the comparing.

11. The method of claim 1, further comprising:

transmitting, to the network entity, one or more reference signals indicating one or more channel quality parameters, wherein the first time-frequency pattern is based at least in part on the one or more channel quality parameters.

12. The method of claim 1, wherein:

the first time-frequency pattern indicates one or more carrier-frequencies for the first subset of synchronization signals, one or more bandwidths for the first subset of synchronization signals, a periodicity for the first subset of synchronization signals, or any combination thereof; and the second time-frequency pattern indicates one or more carrier-frequencies for the second subset of synchronization signals, one or more bandwidths for the second subset of synchronization signals, a periodicity for the second subset of synchronization signals, or any combination thereof.

13. A method for wireless communications at a network entity, comprising:

transmitting a first subset of synchronization signals based at least in part on a first time-frequency pattern;

transmitting a second subset of synchronization signals based at least in part on a second time-frequency pattern different than the first time-frequency pattern, wherein the first subset of synchronization signals and the second subset of synchronization signals are transmitted during a first time interval, wherein each synchronization signal of the first subset of synchronization signals and each synchronization signal of the second subset of synchronization signals is a synchronization signal block (SSB) that comprises a physical broadcast channel payload, wherein the first time-frequency pattern corresponds to a first frequency allocation of the first subset of synchronization signals having a first bandwidth and a first periodicity, and the second time-frequency pattern corresponds to a second frequency allocation of the second subset of synchronization signals having a second bandwidth and a second periodicity, and wherein the first bandwidth and the second bandwidth are different or wherein the first frequency allocation and the second frequency allocation at least partially overlap in time and the first periodicity and the second periodicity are different; and establishing a connection with a user equipment (UE) based at least in part on transmitting the first subset of synchronization signals, the second subset of synchronization signals, or both.

14. The method of claim 13, wherein transmitting the first subset of synchronization signals further comprises:

transmitting an indication of the second time-frequency pattern, wherein one or more synchronization signals of the first subset of synchronization signals comprises the indication.

15. The method of claim 13, wherein the first bandwidth and the second bandwidth are different, and wherein the first frequency allocation is non-overlapping in time with the second frequency allocation.

16. The method of claim 13, wherein the first frequency allocation and the second frequency allocation at least partially overlap in time and the first periodicity and the second periodicity are different.

17. The method of claim 13, wherein the first frequency allocation and the second frequency allocation are separated by a frequency bandwidth that is greater than a channel coherence associated with the first subset of synchronization signals.

18. The method of claim 13, wherein the first bandwidth is different than the second bandwidth, and wherein the first periodicity and the second periodicity are different.

19. The method of claim 18, wherein the first bandwidth is greater than the second bandwidth, and the first bandwidth is greater than a channel coherence associated with the first subset of synchronization signals.

20. The method of claim 13, further comprising:

determining the first time-frequency pattern, the second time-frequency pattern, or both, based at least in part on a configuration.

21. The method of claim 13, further comprising:

receiving a message from the UE that indicates whether to transmit subsequent messages using the first time-frequency pattern, the second time-frequency pattern, or both.

22. The method of claim 13, further comprising:

receiving, from the UE, one or more reference signals indicating one or more channel quality parameters; and determining the first time-frequency pattern based at least in part on the one or more channel quality parameters.

23. The method of claim 13, wherein:

the first time-frequency pattern indicates one or more carrier-frequencies for the first subset of synchronization signals, one or more bandwidths for the first subset of synchronization signals, a periodicity for the first subset of synchronization signals, or any combination thereof; and the second time-frequency pattern indicates one or more carrier-frequencies for the second subset of synchronization signals, one or more bandwidths for the second subset of synchronization signals, a periodicity for the second subset of synchronization signals, or any combination thereof.

24. An apparatus for wireless communications at a user equipment (UE), comprising:

a processor;

memory coupled with the processor; and instructions stored in the memory and executable by the processor to cause the apparatus to:

monitor for a set of synchronization signals that comprises a first subset of synchronization signals that are allocated according to a first time-frequency pattern and a second subset of synchronization signals that are allocated according to a second time-frequency pattern that is different than the first time-frequency pattern, wherein the first subset of synchronization signals and the second subset of synchronization signals are monitored during a first time interval, wherein each synchronization signal of the set of synchronization signals is a synchronization signal block (SSB) that comprises a physical broadcast channel payload, wherein the first time-frequency pattern corresponds to a first frequency allocation of the first subset of synchronization signals having a first bandwidth and a first periodicity, and the second time-frequency pattern corresponds to a second frequency allocation of the second subset of synchronization signals having a second bandwidth and a second periodicity, and wherein the first bandwidth and the second bandwidth are different or wherein the first frequency allocation and the second frequency allocation at least partially overlap in time and the first periodicity and the second periodicity are different;

receive one or more synchronization signals of the set of synchronization signals based at least in part on the monitoring; and establish a connection with a network entity based at least in part on receiving the one or more synchronization signals.

25. The apparatus of claim 24, wherein the instructions are further executable by the processor to cause the apparatus to:

receive an indication of the second time-frequency pattern from one or more synchronization signals of the first subset of synchronization signals.

26. An apparatus for wireless communications at a network entity, comprising:

a processor;

memory coupled with the processor; and instructions stored in the memory and executable by the processor to cause the apparatus to:

transmit a first subset of synchronization signals based at least in part on a first time-frequency pattern;

transmit a second subset of synchronization signals based at least in part on a second time-frequency pattern different than the first time-frequency pattern, wherein the first subset of synchronization signals and the second subset of synchronization signals are transmitted during a first time interval, wherein each synchronization signal of the first subset of synchronization signals and each synchronization signal of the second subset of synchronization signals is a synchronization signal block (SSB) that comprises a physical broadcast channel payload, wherein the first time-frequency pattern corresponds to a first frequency allocation of the first subset of synchronization signals having a first bandwidth and a first periodicity, and the second time-frequency pattern corresponds to a second frequency allocation of the second subset of synchronization signals having a second bandwidth and a second periodicity, and wherein the first bandwidth and the second bandwidth are different or wherein the first frequency allocation and the second frequency allocation at least partially overlap in time and the first periodicity and the second periodicity are different; and establish a connection with a user equipment (UE) based at least in part on transmitting the first subset of synchronization signals, the second subset of synchronization signals, or both.

* * * * *